(12) United States Patent
Nakata et al.

(10) Patent No.: US 7,821,903 B2
(45) Date of Patent: Oct. 26, 2010

(54) OPTICAL PICKUP DEVICE AND OPTICAL RECORDING MEDIUM DRIVING DEVICE

(75) Inventors: Hideki Nakata, Kyoto (JP); Akihiro Arai, Kyoto (JP); Hiroshi Shibata, Fukuoka (JP); Yoichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 499 days.

(21) Appl. No.: 11/980,434

(22) Filed: Oct. 31, 2007

(65) Prior Publication Data

US 2008/0159091 A1 Jul. 3, 2008

(30) Foreign Application Priority Data

Dec. 28, 2006 (JP) ............................. 2006-355347

(51) Int. Cl.
*G11B 7/00* (2006.01)

(52) U.S. Cl. .............................. 369/112.16; 369/44.23; 369/53.27

(58) Field of Classification Search ................................
369/112.16–112.21, 110.03, 110.04, 44.23, 369/116, 53.26, 53.27
See application file for complete search history.

(56) References Cited

U.S. PATENT DOCUMENTS

| | | | | |
|---|---|---|---|---|
| 5,067,117 A | * | 11/1991 | Shimizu et al. | 369/116 |
| 7,164,626 B2 | * | 1/2007 | Lee et al. | 369/44.23 |
| 2004/0022152 A1 | * | 2/2004 | Hayashi | 369/53.2 |
| 2005/0030878 A1 | * | 2/2005 | Park et al. | 369/112.08 |
| 2005/0111516 A1 | * | 5/2005 | Hatano et al. | 372/106 |
| 2005/0152258 A1 | * | 7/2005 | Komma et al. | 369/112.05 |

FOREIGN PATENT DOCUMENTS

JP 62-140253 6/1987

* cited by examiner

*Primary Examiner*—Thang V Tran
(74) *Attorney, Agent, or Firm*—Wenderoth, Lind & Ponack, L.L.P.

(57) ABSTRACT

An optical pickup device has a first light source and a second light source each adapted for outputting a laser beam of a predetermined wavelength, a photodetector for detecting an intensity of the laser beam outputted from the first light source or the second light source to control the power of the laser beam to be outputted from the first light source or the second light source, a wideband quarter wavelength plate for converting the laser beam outputted from the first light source or the second light source into a circularly polarized laser beam, and a first rise-up mirror and a second rise-up mirror for guiding a P-polarized component in the laser beam converted by the wideband quarter wavelength plate to the photodetector, and guiding an S-polarized component in the laser beam different from the P-polarized component to an optical recording medium. With this arrangement, provided are an optical pickup device and an optical recording medium driving device capable of accurately controlling the power of the light source.

18 Claims, 14 Drawing Sheets

OPTICAL PICKUP DEVICE AND OPTICAL RECORDING MEDIUM DRIVING DEVICE

BACKGROUND OF THE INVENTION

1. Field of the Invention

The present invention relates to an optical pickup device for recording and/or reproducing information to and/or from an optical recording medium, and an optical recording medium driving device.

2. Description of the Background Art

A conventional optical pickup device is constructed in such a manner that a P-polarized laser beam is outputted from a semiconductor laser device, and the outputted laser beam is incident onto a photodetector and received by the photodetector after part of the outputted laser beam is reflected on a beam splitter through a collimator lens. The photodetector converts the received laser beam into an electric signal. The electric signal converted by the photodetector is used for controlling the power of the laser beam. Primary part of the laser beam is incident onto an objective lens through the beam splitter, and is condensed on a surface of an optical disc. The laser beam reflected on the optical disc is incident onto the beam splitter again through the objective lens. The laser beam incident onto the beam splitter is reflected thereon and incident onto a servo signal detector and an information signal detector to be received by the servo signal detector and the information signal detector. The servo signal detector converts the received laser beam into an electric signal. The electric signal converted by the servo signal detector is used as a control signal for a servo system. The information signal detector converts the received laser beam into an electric signal. The electric signal converted by the information signal detector is used as an information signal (see e.g. Japanese Unexamined Patent Publication No. Sho 62-140253).

In the conventional optical pickup device, since the P-polarized laser beam is incident onto the beam splitter, the amount of light directed to the objective lens may be reduced. In view of this, in the conventional optical pickup device, a reflectance of the beam splitter is lowered to increase the amount of light directed to the objective lens. This may increase a variation in light amount detected by the photodetector resulting from a variation in recording layer thickness.

In the case where the reflectance of the beam splitter is lowered, a change in light amount detected by the photodetector relative to the wavelength may be increased due to wavelength dependence of the reflectance, and the light amount detected by the photodetector may be changed due to a wavelength change of a laser beam resulting from a temperature change. This may make it difficult to accurately control the power of the laser beam.

SUMMARY OF THE INVENTION

In view of the above problems residing in the conventional examples, it is an object of the present invention to provide an optical pickup device and an optical recording medium driving device that enable to accurately control the power of a light source.

An optical pickup device according to an aspect of the invention comprises: a light source for outputting a laser beam of a predetermined wavelength; a photodetector for detecting an intensity of the laser beam outputted from the light source to control a power of the laser beam to be outputted from the light source; a polarization beam converter for converting the laser beam outputted from the light source into a circularly polarized laser beam; and a mirror for guiding part of the laser beam converted by the polarization beam converter to the photodetector, and guiding the remainder of the laser beam to an optical recording medium.

An optical recording medium driving device according to another aspect of the invention is an optical recording medium driving device for recording and/or reproducing information to and/or from an optical recording medium. The optical recording medium driving device comprises a spindle motor for rotating the optical recording medium, and the aforementioned optical pickup device. The optical pickup device includes: a signal detector for receiving the laser beam reflected on the optical recording medium and converting the received laser beam into an electric signal in accordance with a light intensity of the received laser beam; an actuator for driving the optical pickup device at least in a radial direction with respect to an information track in the optical recording medium; a signal processor for generating a tracking error signal based on the electric signal sent from the signal detector of the optical pickup device; and a controller for controlling driving of the spindle motor, and controlling driving of the actuator to perform tracking servo control with respect to the optical recording medium based on the tracking error signal sent from the signal processor.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
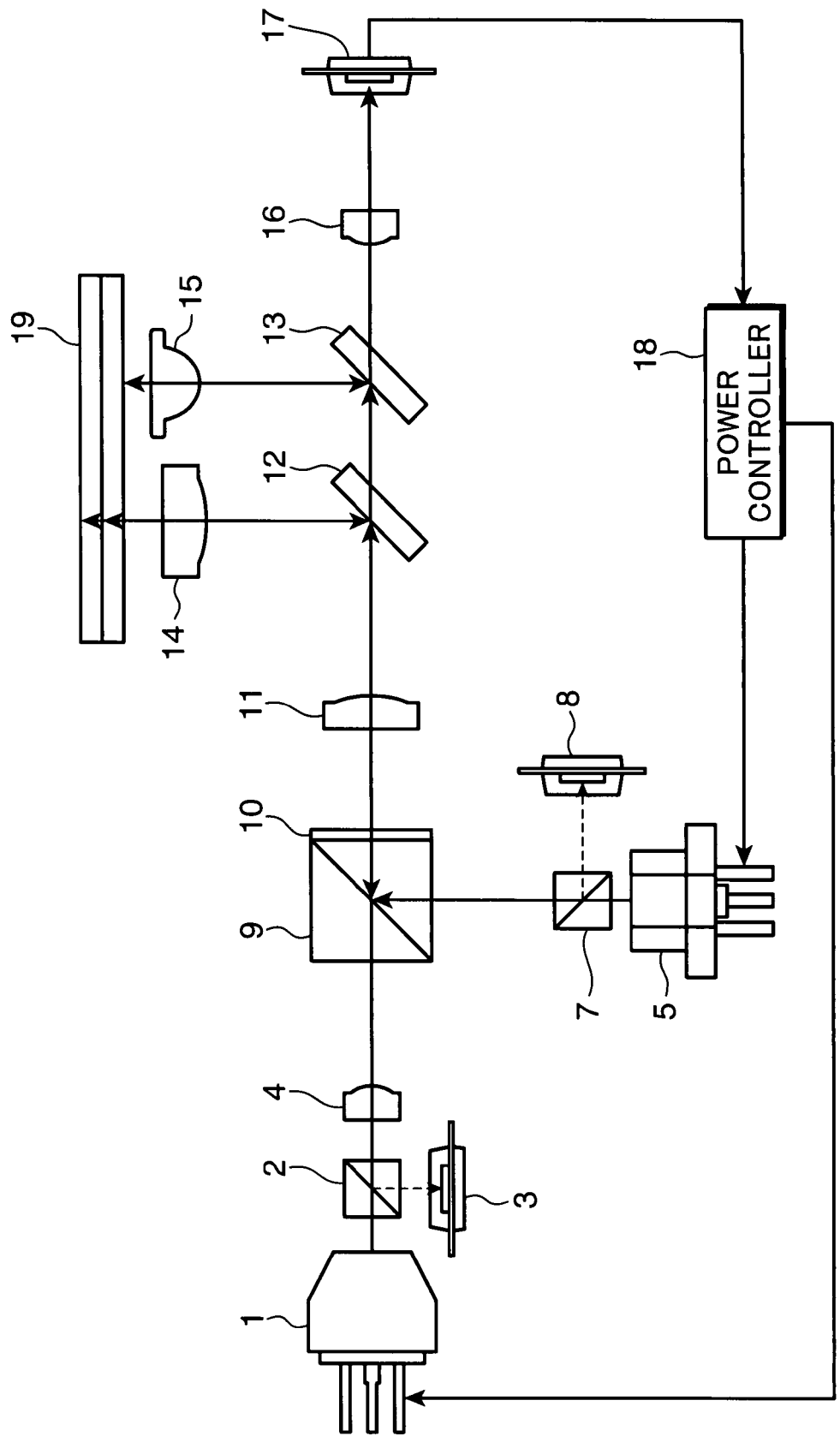
FIG. 1 is a diagram showing an arrangement of an optical pickup device in accordance with a first embodiment of the invention.

In the following, embodiments of the invention are described referring to the drawings. It should be appreciated that the following embodiments are merely examples embodying the invention, and do not limit the technical scope of the invention.

First Embodiment

FIG. 1 is a diagram showing an arrangement of an optical pickup device in accordance with a first embodiment of the invention. The optical pickup device shown in FIG. 1 includes a first light source 1, a beam splitter 2, a first signal detector 3, a relay lens 4, a second light source 5, a beam splitter 7, a second signal detector 8, a beam splitter 9, a wideband quarter wavelength plate 10, a collimator lens 11, a first rise-up mirror 12, a second rise-up mirror 13, a first objective lens 14, a second objective lens 15, a condenser lens 16, a photodetector 17, and a power controller 18.

The first light source 1 outputs a first laser beam of a first wavelength $\lambda 1$, and outputs a second laser beam of a second wavelength $\lambda 2$ shorter than the first wavelength $\lambda 1$. The first laser beam is an infrared ray for recording information on an optical recording medium 19, or reproducing information from the optical recording medium 19. The second laser beam is a red ray for recording information on the optical recording medium 19, or reproducing information from the optical recording medium 19. The first wavelength $\lambda 1$ of the infrared ray is e.g. 780 nm, and the second wavelength $\lambda 2$ of the red ray is e.g. 660 nm. In the case where he optical recording medium 19 is a CD, the first laser beam as the infrared ray is used. In the case where the optical recording medium 19 is a DVD, the second laser beam as the red ray is used. The first wavelength $\lambda 1$ is not limited to 780 nm, but an infrared ray having a wavelength band from 780 nm to 820 nm may be used. The second wavelength $\lambda 2$ is not limited to 660 nm, but a red ray having a wavelength band from 630 nm to 680 nm may be used.

The beam splitter 2 transmits the first laser beam or the second laser beam outputted from the first light source 1, and guides the laser beam reflected on the optical recording medium 19 to the first signal detector 3.

The first signal detector 3 receives the laser beam reflected on the optical recording medium 19, converts the received laser beam into an electric signal, and detects various signals such as a focusing signal, a tracking signal, and an RF signal based on the electric signal. The relay lens 4 relays the first laser beam or the second laser beam outputted from the first light source 1.

The second light source 5 outputs a third laser beam of a third wavelength $\lambda 3$ shorter than the second wavelength $\lambda 2$. The third laser beam is a blue ray for recording information on the optical recording medium 19 or reproducing information from the optical recording medium 19. The third wavelength $\lambda 3$ of the blue ray is e.g. 405 nm. In the case where the optical recording medium 19 is a BD (Blu-ray Disc), the third laser beam as the blue ray is used. The third wavelength $\lambda 3$ is not limited to 405 nm, but a blue ray having a wavelength band from 390 nm to 415 nm may be used.

The beam splitter 7 transmits the third laser beam outputted from the second light source 5, and guides the laser beam reflected on the optical recording medium 19 to the second signal detector 8. The second signal detector 8 receives the laser beam reflected on the optical recording medium 19, converts the received laser beam into an electric signal, and detects various signals such as a focusing signal, a tracking signal, and an RF signal based on the electric signal.

The beam splitter 9 transmits the first laser beam or the second laser beam outputted from the first light source 1 toward the first rise-up mirror 12, and reflects the third laser beam outputted from the second light source 5 toward the first rise-up mirror 12. The beam splitter 9 transmits the first laser beam or the second laser beam reflected on the optical recording medium 19 toward the relay lens 4, and reflects the third laser beam reflected on the optical recording medium 19 toward the second light source 5.

The wideband quarter wavelength plate 10 converts the first laser beam or the second laser beam outputted from the first light source 1, or the third laser beam outputted from the second light source 5 from a linearly polarized laser beam into a circularly polarized laser beam, and converts the laser beam reflected on the optical recording medium 19 from a circularly polarized laser beam into a linearly polarized laser beam. Specifically, the wideband quarter wavelength plate 10 generates a phase difference of a quarter wavelength=90° with respect to the transmitted laser beam to convert a linearly polarized laser beam into a circularly polarized laser beam or a circularly polarized laser beam into a linearly polarized laser beam. The wideband quarter wavelength plate 10 converts the laser beams of three different wavelengths i.e. an infrared ray ($\lambda 1$=780 nm), a red ray ($\lambda 2$=660 nm), and a blue ray ($\lambda 3$=405 nm) into a circularly polarized laser beam.

The collimator lens 11 collimates the first laser beam, the second laser beam, or the third laser beam that has been converted into a circularly polarized laser beam by the wideband quarter wavelength plate 10 into parallel beams.

The first rise-up mirror 12 is a partly transmitting mirror for transmitting part of the first laser beam, part of the second laser beam, and all of the third laser beam that have been converted into a circularly polarized laser beam by the wideband quarter wavelength plate 10; and reflecting the remainder of the first laser beam and the remainder of the second laser beam toward the optical recording medium 19. For instance, a circularly polarized laser beam includes a P-polarized component whose electric field vector direction is aligned with the plane of FIG. 1, and an S-polarized component whose electric field vector direction is perpendicular to the plane of FIG. 1. The first rise-up mirror 12 has a characteristic that a transmittance Tp of a P-polarized component and a transmittance Ts of an S-polarized component in the first laser beam and the second laser beam are respectively a predetermined value and 0 i.e. 0%; and a transmittance Tp of a P-polarized component and a transmittance Ts of an S-polarized component in the third laser beam are both 1 i.e. 100%. In this embodiment, the first rise-up mirror 12 has a characteristic that the transmittance Ts of the S-polarized component in the first laser beam and the second laser beam is 0%, but ±20% margin of error is allowed. Also, the first rise-up mirror 12 has a characteristic that the transmittance Tp of the P-polarized component and the transmittance Ts of the S-polarized component in the third laser beam are both 100%, but ±20% margin of error is allowed.

The second rise-up mirror 13 is a partly transmitting mirror for transmitting all of the first laser beam, all of the second laser beam, and part of the third laser beam that have been transmitted through the first rise-up mirror 12 toward the photodetector 17; and reflecting the remainder of the third laser beam toward the optical recording medium 19. For instance, the second rise-up mirror 13 has a characteristic that the transmittance Tp of the P-polarized component and the transmittance Ts of the S-polarized component in the first laser beam and the second laser beam are respectively a predetermined value and 0 i.e. 0%; and the transmittance Tp of the P-polarized component and the transmittance Ts of the S-polarized component in the third laser beam are respectively a predetermined value and 0 i.e. 0%. In this embodiment, the second rise-up mirror 13 has a characteristic that the transmittance Ts of the S-polarized component in the first laser beam and the second laser beam, and the transmittance Ts of the S-polarized component in the third laser beam are both 0%, but ±20% margin error is allowed.

In this embodiment, the laser beams incident onto the first and the second rise-up mirrors 12 and 13 are each a circularly polarized laser beam. However, the laser beams are not necessarily circularly polarized laser beams. An elliptically polarized laser beam may be used, although an effect of increasing the amount of light to be guided to the optical recording medium 19 may be decreased. In the specification and claims, an elliptically polarized laser beam substantially analogous to a circularly polarized laser beam, with an intensity ratio of the longer diameter of the elliptically polarized laser beam to the shorter diameter thereof being about 2, is called as a circularly polarized laser beam.

The first objective lens 14 condenses the first laser beam or the second laser beam reflected on the first rise-up mirror 12 on the recording surface of the optical recording medium 19. The second objective lens 15 condenses the third laser beam reflected on the second rise-up mirror 13 on the recording surface of the optical recording medium 19. The condenser lens 16 condenses the first laser beam, the second laser beam, and the third laser beam that have been transmitted through the first rise-up mirror 12 and the second rise-up mirror 13 on the light receiving surface of the photodetector 17.

The photodetector 17 receives the first laser beam, the second laser beam, or the third laser beam that has been transmitted through the first rise-up mirror 12 and the second rise-up mirror 13, and outputs an electric signal in accordance with a light intensity of the received laser beam to the power controller 18 to control the powers of the first laser beam and the second laser beam outputted from the first light source 1, and the power of the third laser beam outputted from the second light source 5.

The power controller 18 controls power of the first laser beam or the second laser beam outputted from the first light source 1, or the third laser beam outputted from the second light source 5, based on the signal outputted from the photodetector 17.

In this embodiment, the first light source 1 and the second light source 5 correspond to an example of a light source, the photodetector 17 corresponds to an example of a photodetector, the wideband quarter wavelength plate 10 corresponds to an example of a polarization beam converter, and the first rise-up mirror 12 and the second rise-up mirror 13 correspond to an example of a mirror. The first light source 1 corresponds to an example of a first light source, the second light source 5 corresponds to an example of a second light source, the first rise-up mirror 12 corresponds to an example of a first mirror, the second rise-up mirror 13 corresponds to an example of a second mirror, and the beam splitter 9 corresponds to an example of a beam splitter.

In the following, an operation of the optical pickup device in accordance with the first embodiment is described referring to FIG. 1. First, laser power control in the case where a laser beam is outputted from the first light source 1 is described. Since the operation of the first laser beam as the infrared ray, and the operation of the second laser beam as the red ray are the same, the operation of the first laser beam is described as a representative in the following.

First, the first light source 1 outputs the first laser beam of the first wavelength λ1. The first wavelength λ1 is e.g. 780 nm. The first laser beam outputted from the first light source 1 is incident onto the beam splitter 2. The beam splitter 2 transmits the first laser beam. The first laser beam transmitted through the beam splitter 2 propagates to the beam splitter 9 by the relay lens 4.

The beam splitter 9 transmits the incident first laser beam. The first laser beam transmitted through the beam splitter 9 is incident onto the wideband quarter wavelength plate 10. The wideband wavelength plate 10 converts the incident first laser beam from a linearly polarized laser beam into a circularly polarized laser beam. The first laser beam which has been converted into a circularly polarized laser beam by the wideband quarter wavelength plate 10 is incident onto the collimator lens 11. The collimator lens 11 collimates the incident first laser beam into parallel beams. The first laser beam which has been collimated into parallel beams by the collimator lens 11 is incident onto the first rise-up mirror 12.

Figure 2:
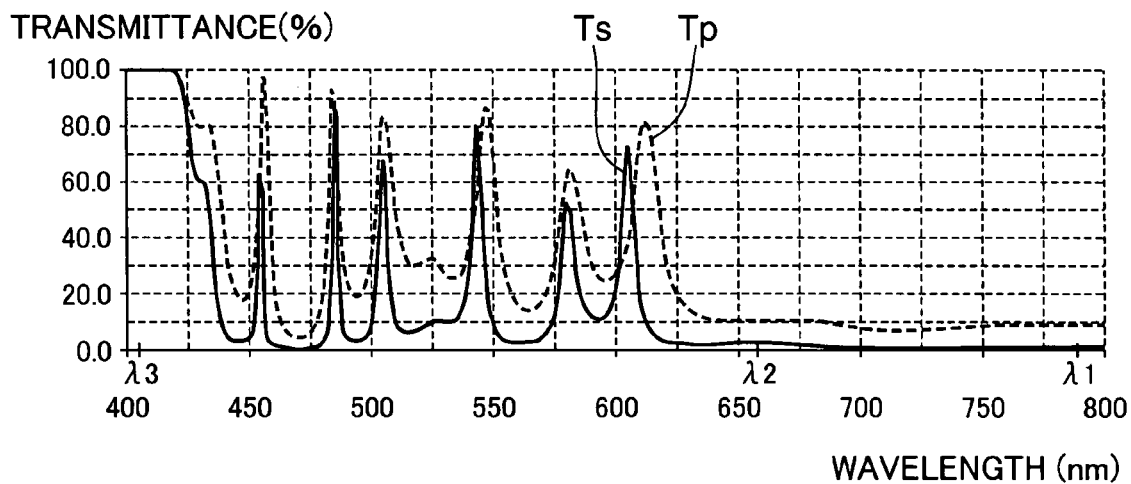
FIG. 2 is a diagram showing a relation between the wavelength of a laser beam to be incident onto a first rise-up mirror, and the transmittance of the first rise-up mirror in the first embodiment.

The first rise-up mirror 12 transmits part of the incident first laser beam toward the second rise-up mirror 13, and reflects the remainder of the first laser beam toward the first objective lens 4. FIG. 2 is a diagram showing a relation between the wavelength of a laser beam to be incident onto the first rise-up mirror, and the transmittance of the first rise-up mirror in the first embodiment. In FIG. 2, the axis of abscissas indicates the wavelength of a laser beam, and the axis of ordinate represents the transmittance of the laser beam. In FIG. 2, the broken line represents the transmittance Tp of the P-polarized component, and the solid line represents the transmittance Ts of the S-polarized component.

As shown in FIG. 2, the first rise-up mirror 12 has a characteristic that the transmittance Tp of the P-polarized component and the transmittance Ts of the S-polarized component in the first laser beam of the first wavelength λ1 (=780 nm) are respectively about 10% and about 0%. The first rise-up mirror 12 also has a characteristic that the transmittance Tp of the P-polarized component and the transmittance Ts of the S-polarized component in the second laser beam of the second wavelength λ2 (=660 nm) are respectively about 10% and about 0%.

Figure 3:
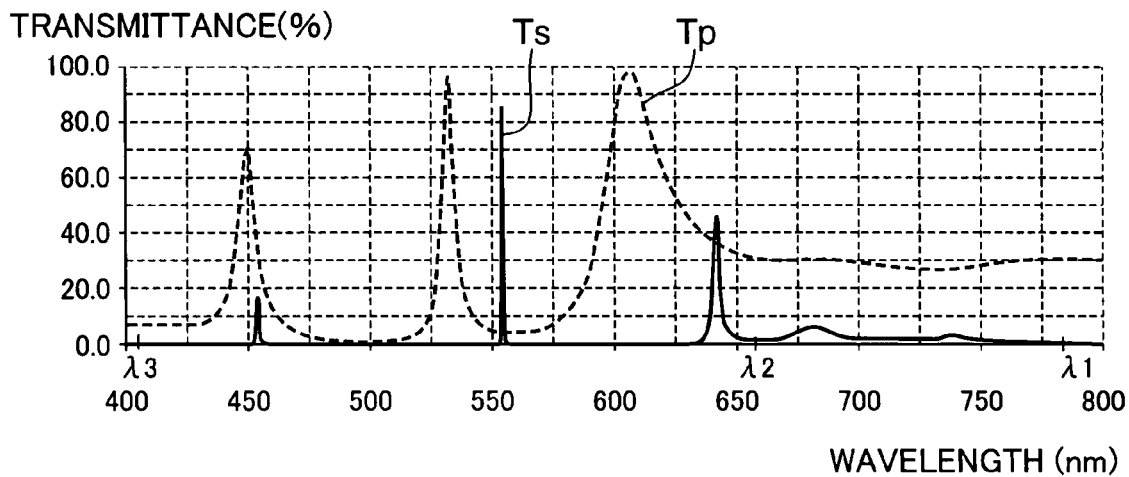
FIG. 3 is a diagram showing a relation between the wavelength of a laser beam to be incident onto a second rise-up mirror, and the transmittance of the second rise-up mirror in the first embodiment.

Referring back to FIG. 1, part of the first laser beam transmitted through the first rise-up mirror 12 is incident onto the second rise-up mirror 13. The second rise-up mirror 13 transmits part of the incident first laser beam toward the condenser lens 16. FIG. 3 is a diagram showing a relation between the wavelength of a laser beam to be incident onto the second rise-up mirror, and the transmittance of the second rise-up mirror in the first embodiment. In FIG. 3, the axis of abscissas indicates the wavelength of a laser beam, and the axis of ordinate indicates the transmittance of the laser beam. In FIG. 3, the broken line represents the transmittance Tp of the P-polarized component, and the solid line represents the transmittance Ts of the S-polarized component.

As shown in FIG. 3, the second rise-up mirror 13 has a characteristic that the transmittance Tp of the P-polarized component and the transmittance Ts of the S-polarized component in the first laser beam of the first wavelength λ1 (=780 nm) are respectively about 30% and about 0%. Also, the second rise-up mirror 13 has a characteristic that the transmittance Tp of the P-polarized component and the transmittance Ts of the S-polarized component in the second laser beam of the second wavelength λ2 (=660 nm) are respectively about 30% and about 0%.

The remainder of the first laser beam which has not transmitted through the second rise-up mirror 13 is reflected toward the second objective lens 15. However, there is no likelihood that the second objective lens 15 may condense the first laser beam on the recording surface of the optical recording medium 19. Accordingly, the behavior of the first laser beam reflected toward the second objective lens 15 can be neglected.

In this embodiment, the second rise-up mirror 13 transmits part of the first laser beam transmitted through the first rise-up mirror 12. Alternatively, the second rise-up mirror 13 may transmit all of the first laser beam transmitted through the first rise-up mirror 12.

Referring back to FIG. 1, the condenser lens 16 condenses part of the first laser beam transmitted through the second rise-up mirror 13 on the photodetector 17. The photodetector 17 receives part of the first laser beam, and outputs an electric signal i.e. a light intensity signal in accordance with the light intensity of the received first laser beam to the power controller 18. The power controller 18 controls the laser output of the first light source 1 in accordance with the light intensity signal outputted from the photodetector 17.

On the other hand, the first laser beam reflected on the first rise-up mirror 12 is incident onto the first objective lens 14. The first objective lens 14 condenses the first laser beam on the recording surface of the optical recording medium 19. Then, the laser beam reflected on the recording surface of the optical recording medium 19 is transmitted through the first objective lens 14 again, and incident onto the first rise-up mirror 12. The first rise-up mirror 12 reflects the reflected laser beam toward the collimator lens 11. The reflected laser beam transmitted through the collimator lens 11 is converted from a circularly polarized laser beam into a linearly polarized laser beam by the wideband quarter wavelength plate 10 for incidence onto the beam splitter 9. The reflected laser beam transmitted through the beam splitter 9 propagates through the relay lens 4 and is incident onto the beam splitter 2. The beam splitter 2 reflects the laser beam toward the first signal detector 3. The laser beam reflected on the beam splitter 2 is incident onto the first signal detector 3. The first signal detector 3 receives the laser beam reflected on the optical recording medium 19, converts the received laser beam into an electric signal, and detects various signals such as a focusing signal, a tracking signal, and an RF signal based on the electric signal. Then, controls such as focusing control and tracking control are performed based on the detected signals.

Next, laser power control in the case where a laser beam is outputted from the second light source 5 is described. The second light source 5 outputs the third laser beam of the third wavelength λ3. The third wavelength λ3 is e.g. 405 nm. The third laser beam outputted from the second light source 5 is incident onto the beam splitter 7. The beam splitter 7 transmits the third laser beam outputted from the second light source 5. The third laser beam transmitted through the beam splitter 7 is incident onto the beam splitter 9.

The beam splitter 9 reflects the incident third laser beam toward the collimator lens 11. The third laser beam reflected on the beam splitter 9 is incident onto the wideband quarter wavelength plate 10. The wideband quarter wavelength plate 10 converts the incident third laser beam from a linearly polarized laser beam into a circularly polarized laser beam. The third laser beam which is converted into a circularly polarized laser beam by the wideband quarter wavelength plate 10 is incident onto the collimator lens 11. The collimator lens 11 collimates the incident third laser beam into parallel beams. The third laser beam which has been collimated into parallel beams by the collimator lens 11 is incident onto the first rise-up mirror 12.

The first rise-up mirror 12 transmits all of the incident third laser beam toward the second rise-up mirror 13. As shown in FIG. 2, the first rise-up mirror 12 has a characteristic that the transmittance Tp of the P-polarized component and the transmittance Ts of the S-polarized component in the third laser beam of the third wavelength λ3 (=405 nm) are respectively 100% and 100%.

Referring back to FIG. 1, the third laser beam transmitted through the first rise-up mirror 12 is incident onto the second rise-up mirror 13. The second rise-up mirror 13 transmits part of the incident third laser beam toward the condenser lens 16, and reflects the remainder of the third laser beam toward the second objective lens 15. As shown in FIG. 3, the second rise-up mirror 13 has a characteristic that the transmittance Tp of the P-polarized component and the transmittance Ts of the S-polarized component in the third laser beam of the third wavelength λ3 (=405 nm) are respectively about 7% and about 0%.

Referring back to FIG. 1, the condenser lens 16 condenses part of the third laser beam transmitted through the second rise-up mirror 13 on the photodetector 17. The photodetector 17 receives part of the third laser beam, and outputs an electric signal i.e. a light intensity signal in accordance with the light intensity of the received third laser beam to the power controller 18. The power controller 18 controls the laser output of the second light source 5 in accordance with the light intensity signal outputted from the photodetector 17.

On the other hand, the third laser beam reflected on the second rise-up mirror 13 is incident onto the second objective lens 15. The second objective lens 15 condenses the third laser beam on the recording surface of the optical recording medium 19. The laser beam reflected on the recording surface of the optical recording medium 19 is transmitted through the second objective lens 15 again and incident onto the second rise-up mirror 13. The second rise-up mirror 13 reflects the reflected laser beam toward the first rise-up mirror 12. The reflected laser beam transmitted through the first rise-up mirror 12 is incident onto the collimator lens 11. The reflected laser beam transmitted through the collimator lens 11 is converted from a circularly polarized laser beam into a linearly polarized laser beam by the wideband quarter wavelength plate 10 for incidence onto the beam splitter 9. The beam splitter 9 reflects the incident reflected laser beam toward the second light source 5. The laser beam reflected on the beam splitter 9 is incident onto the beam splitter 7. The beam splitter 7 reflects the reflected laser beam toward the second signal detector 8. The laser beam reflected on the beam splitter 7 is incident onto the second signal detector 8. The second signal detector 8 receives the laser beam reflected on the optical recording medium 19, converts the received laser beam into an electric signal, and detects various signals such as a focusing signal, a tracking signal, and an RF signal based on the electric signal. Then, controls such as focusing control and tracking control are performed based on the detected signals.

As described above, a laser beam of a predetermined wavelength is outputted from the first light source 1 or the second light source 5, and the laser beam outputted from the first light source 1 or the second light source 5 is converted into a circularly polarized laser beam. Then, part of the circularly polarized laser beam is guided to the photodetector 17, and the remainder thereof is guided to the optical recording medium 19.

The laser beam incident onto the first rise-up mirror 12 or the second rise-up mirror 13 is a circularly polarized laser beam, and the first rise-up mirror 12 and the second rise-up mirror 13 have a characteristic that the transmittance Ts of the S-polarized component is substantially 0. As a result, the laser beam transmitted through the first rise-up mirror 12 or the second rise-up mirror 13 is solely a P-polarized component. Accordingly, the intensity ratio of the laser beam incident onto the first rise-up mirror 12 or the second rise-up mirror 13 to the laser beam transmitted therethrough is substantially half of the transmittance Tp of the P-polarized component. In other words, by setting the transmittance Tp to the value of the conventional transmittance, the amount of light to be guided to the photodetector 17 can be halved while retaining a change of the transmittance Tp resulting from an optical characteristic variation relating to a recording layer thickness or a wavelength change substantially the same as in the conventional art. With this arrangement, the powers of the first light source 1 and the second light source 5 can be controlled with high precision, while securely increasing the amount of light to be guided to the optical recording medium 19, as compared with the conventional art.

The first light source 1 outputs the first laser beam of the first wavelength λ1 and the second laser beam of the second wavelength λ2 shorter than the first wavelength λ1. The second light source 5 outputs the third laser beam of the third wavelength λ3 shorter than the second wavelength λ2. The first laser beam is converted into a first circularly polarized laser beam, the second laser beam is converted into a second circularly polarized laser beam, and the third laser beam is converted into a third circularly polarized laser beam. Then, the first rise-up mirror 12 transmits part of the first laser beam, part of the second laser beam, and all of the third laser beam that have been converted into a circularly polarized laser beam, and reflects the remainder of the first laser beam and the remainder of the second laser beam toward the optical recording medium 19. The second rise-up mirror 13 transmits all of the first laser beam, all of the second laser beam, and part of the third laser beam that have been transmitted through the first rise-up mirror 12 toward the photodetector 17, and reflects the remainder of the third laser beam toward the optical recording medium 19.

In the above operation, the first rise-up mirror 12 transmits part of the P-polarized component in the first laser beam and the second laser beam, reflects all of the S-polarized component in the first laser beam and the second laser beam toward the optical recording medium 19, and transmits all of the P-polarized component and all of the S-polarized component in the third laser beam. The second rise-up mirror 13 transmits part of the P-polarized component in the first laser beam and the second laser beam, transmits part of the P-polarized component in the third laser beam, and reflects all of the S-polarized component in the third laser beam toward the optical recording medium 19.

In the above arrangement, the first laser beam of the first wavelength λ1, and the second laser beam of the second wavelength λ2 shorter than the first wavelength λ1 are guided to the optical recording medium 19 by the first rise-up mirror 12. The third laser beam of the third wavelength λ3 shorter than the second wavelength λ2 is guided to the optical recording medium 19 by the second rise-up mirror 13. The first laser beam, the second laser beam, and the third laser beam are guided to the photodetector 17.

In the optical pickup device in accordance with the first embodiment, the beam splitter 9 transmits the first laser beam and the second laser beam outputted from the first light source 1 toward the first rise-up mirror 12, and reflects the third laser beam outputted from the second light source 5 toward the first rise-up mirror 12. The wideband quarter wavelength plate 10 is disposed between the beam splitter 9 and the first rise-up mirror 12. With this arrangement, the laser beam incident onto the first rise-up mirror 12 can be converted into a circularly polarized laser beam before its incidence onto the first rise-up mirror 12.

Figure 4:
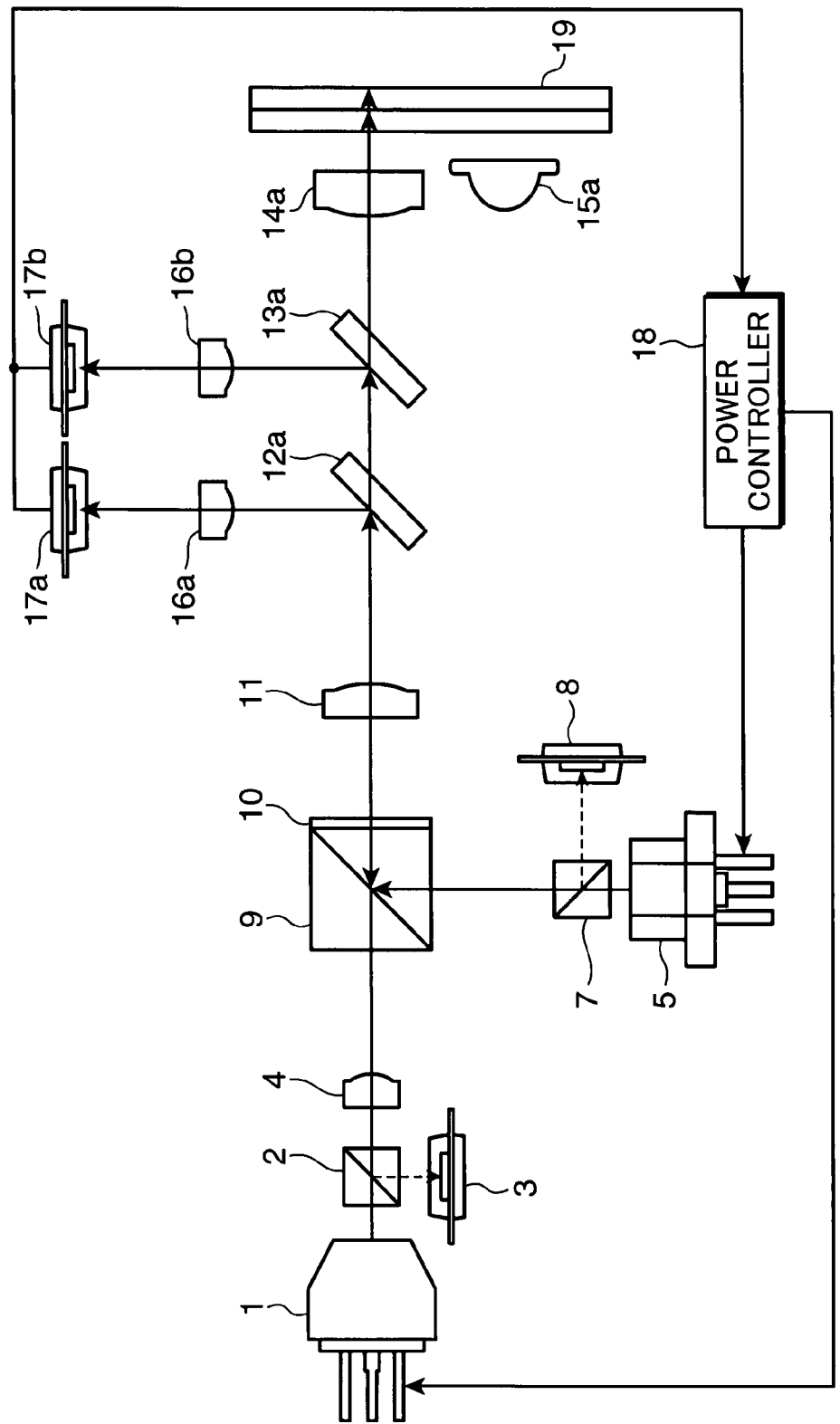
FIG. 4 is a diagram showing an arrangement of an optical pickup device as a modification of the first embodiment.

In this embodiment, the first rise-up mirror 12 and the second rise-up mirror 13 each is a partly transmitting mirror. Alternatively, the first rise-up mirror 12 and the second rise-up mirror 13 each may be a partly reflecting mirror. FIG. 4 is a diagram showing an arrangement of an optical pickup device as a modification of the first embodiment. Elements in FIG. 4 identical or substantially equivalent to those of the optical pickup device in FIG. 1 are indicated by the same reference numerals, and description thereof is omitted herein, and merely an arrangement different from that in the first embodiment is described.

A first rise-up mirror 12a is a partly reflecting mirror for reflecting part of a first laser beam and part of a second laser beam that have been converted into a circularly polarized laser beam by a wideband quarter wavelength plate 10 toward a first photodetector 17a; and transmitting the remainder of the first laser beam and the remainder of the second laser beam, and all of the third laser beam that has been converted into a circularly polarized laser beam by the wideband quarter wavelength plate 10 toward the optical recording medium 19.

The first rise-up mirror 12a has a characteristic that a reflectance Rp of a P-polarized component and a reflectance Rs of an S-polarized component in the first laser beam and the second laser beam are respectively 0 i.e. 0% and a predetermined value; and a reflectance Rp of a P-polarized component and a reflectance Rs of an S-polarized component in the third laser beam are both 0 i.e. 0%. In the modification, the first rise-up mirror 12a has a characteristic that the reflectance Rp of the P-polarized component in the first laser beam and the second laser beam, and the reflectance Rp of the P-polarized component and the reflectance Rs of the S-polarized component in the third laser beam are all 0%, but ±20% margin of error is allowed.

The second rise-up mirror 13a is a partly reflecting mirror for reflecting part of the third laser beam transmitted through the first rise-up mirror 12a toward a second photodetector 17b; and transmitting all of the first laser beam and all of the second laser beam that have been transmitted through the first rise-up mirror 12a, and the remainder of the third laser beam toward the optical recording medium 19.

The second rise-up mirror 13a has a characteristic that a reflectance Rp of a P-polarized component and a reflectance Rs of an S-polarized component in the first laser beam and the second laser beam are respectively 0 i.e. 0% and a predetermined value; and a reflectance Rp of a P-polarized component and a reflectance Rs of an S-polarized component in the third laser beam are respectively 0 i.e. 0% and a predetermined value. In the modification, the second rise-up mirror 13a has a characteristic that the reflectance Rp of the P-polarized component in the first laser beam and the second laser beam, and the reflectance Rp of the P-polarized component in the third laser beam are all 0%, but ±20% margin of error is allowed.

A first objective lens 14a condenses the first laser beam or the second laser beam transmitted through the first rise-up mirror 12a and the second rise-up mirror 13a on the recording surface of the optical recording medium 19. A second objective lens 15a condenses the third laser beam transmitted through the first rise-up mirror 12a and the second rise-up mirror 13a on the recording surface of the optical recording medium 19. The first objective lens 14a and the second objective lens 15a are movable in a direction perpendicularly intersecting with an optical axis of the laser beam by an unillustrated motor. In the case where the first laser beam or the second laser beam is condensed on the recording surface of the optical recording medium 19, the motor is driven to move the first objective lens 14a along the optical axis. In the case where the third laser beam is condensed on the recording surface of the optical recording medium 19, the motor is driven to move the second objective lens 15a along the optical axis.

A condenser lens 16a condenses the first laser beam and the second laser beam reflected on the first rise-up mirror 12a on the light receiving surface of the first photodetector 17a. The condenser lens 16b condenses the third laser beam reflected on the second rise-up mirror 13a on the light receiving surface of the second photodetector 17b.

In the modification, the optical pickup device is provided with the two photodetectors i.e. the first photodetector 17a and the second photodetector 17b. Alternatively, the optical pickup device may be provided with a single photodetector to detect the first laser beam, the second laser beam, and the third laser beam.

As described above, the first light source 1 outputs the first laser beam of the first wavelength $\lambda 1$, and the second laser beam of the second wavelength $\lambda 2$ shorter than the first wavelength $\lambda 1$. The second light source 5 outputs the third laser beam of the third wavelength $\lambda 3$ shorter than the second wavelength $\lambda 2$. The first laser beam is converted into a first circularly polarized laser beam, the second laser beam is converted into a second circularly polarized laser beam, and the third laser beam is converted into a third circularly polarized laser beam. Then, the first rise-up mirror 12a reflects part of the first laser beam and part of the second laser beam that have been converted into a circularly polarized laser beam toward the first photodetector 17a, and transmits the remainder of the first laser beam and the remainder of the second laser beam, and all of the third laser beam that has been converted into a circularly polarized laser beam. The second rise-up mirror 13a reflects part of the third laser beam transmitted through the first rise-up mirror 12a toward the second photodetector 17b, and transmits all of the first laser beam and all of the second laser beam that have been transmitted through the first rise-up mirror 12a, and the remainder of the third laser beam toward the optical recording medium 19.

In the above operation, the first rise-up mirror 12a transmits all of the P-polarized component in the first laser beam and the second laser beam toward the optical recording medium 19, reflects part of the S-polarized component in the first laser beam and the second laser beam toward the first photodetector 17a, and transmits all of the P-polarized component and all of the S-polarized component in the third laser beam toward the optical recording medium 19. The second rise-up mirror 13a transmits all of the P-polarized component in the first laser beam and the second laser beam, transmits all of the P-polarized component in the third laser beam toward the optical recording medium 19, and reflects part of the S-polarized component in the third laser beam toward the second photodetector 17b.

In the above arrangement, the first laser beam of the first wavelength $\lambda 1$, and the second laser beam of the second wavelength $\lambda 2$ shorter than the first wavelength $\lambda 1$ are guided to the first photodetector 17a by the first rise-up mirror 12a.

The third laser beam of the third wavelength $\lambda 3$ shorter than the second wavelength $\lambda 2$ is guided to the second photodetector 17b by the second rise-up mirror 13a. The first laser beam, the second laser beam, and the third laser beam are guided to the optical recording medium 19.

In the embodiment, the wideband quarter wavelength plate 10 for converting laser beams of three different wavelengths into a circularly polarized laser beam is disposed between the beam splitter 9 and the collimator lens 11. Alternatively, the transmitting/reflecting surface of the beam splitter 9 may be coated with a coat having the substantially same function as the wideband quarter wavelength plate.

In this embodiment, the first rise-up mirror 12 reflects a red ray for DVD and an infrared ray for CD toward the first objective lens 14, and the second rise-up mirror 13 reflects a blue ray for BD toward the second objective lens 15. Alternatively, for instance, the first rise-up mirror 12 may reflect a red ray for DVD, an infrared ray for CD, and a blue ray for HD DVD toward the first objective lens 14, and the second rise-up mirror 13 may reflect a blue ray for BD toward the second objective lens 15. Further alternatively, for instance, the first rise-up mirror 12 may reflect a red ray for DVD and an infrared ray for CD toward the first objective lens 14, and the second rise-up mirror 13 may reflect a blue ray for BD and a blue ray for HD DVD toward the second objective lens 15.

The optical pickup device in this embodiment is provided with the first rise-up mirror 12 for reflecting a red ray and an infrared ray toward the first objective lens 14, and the second rise-up mirror 13 for reflecting a blue ray toward the second objective lens 15. Alternatively, the optical pickup device may be provided with a single rise-up mirror for reflecting laser beams of three different wavelengths i.e. a red ray, an infrared ray, and a blue ray toward an objective lens.

Second Embodiment

In this section, an optical pickup device in accordance with a second embodiment of the invention is described. In the first embodiment, the first rise-up mirror reflects the first laser beam and the second laser beam toward the optical recording medium 19, and the second rise-up mirror reflects the third laser beam toward the optical recording medium 19. In the second embodiment, a first rise-up mirror reflects a third laser beam toward the optical recording medium 19, and a second rise-up mirror reflects a first laser beam and a second laser beam toward the optical recording medium 19.

Figure 5:
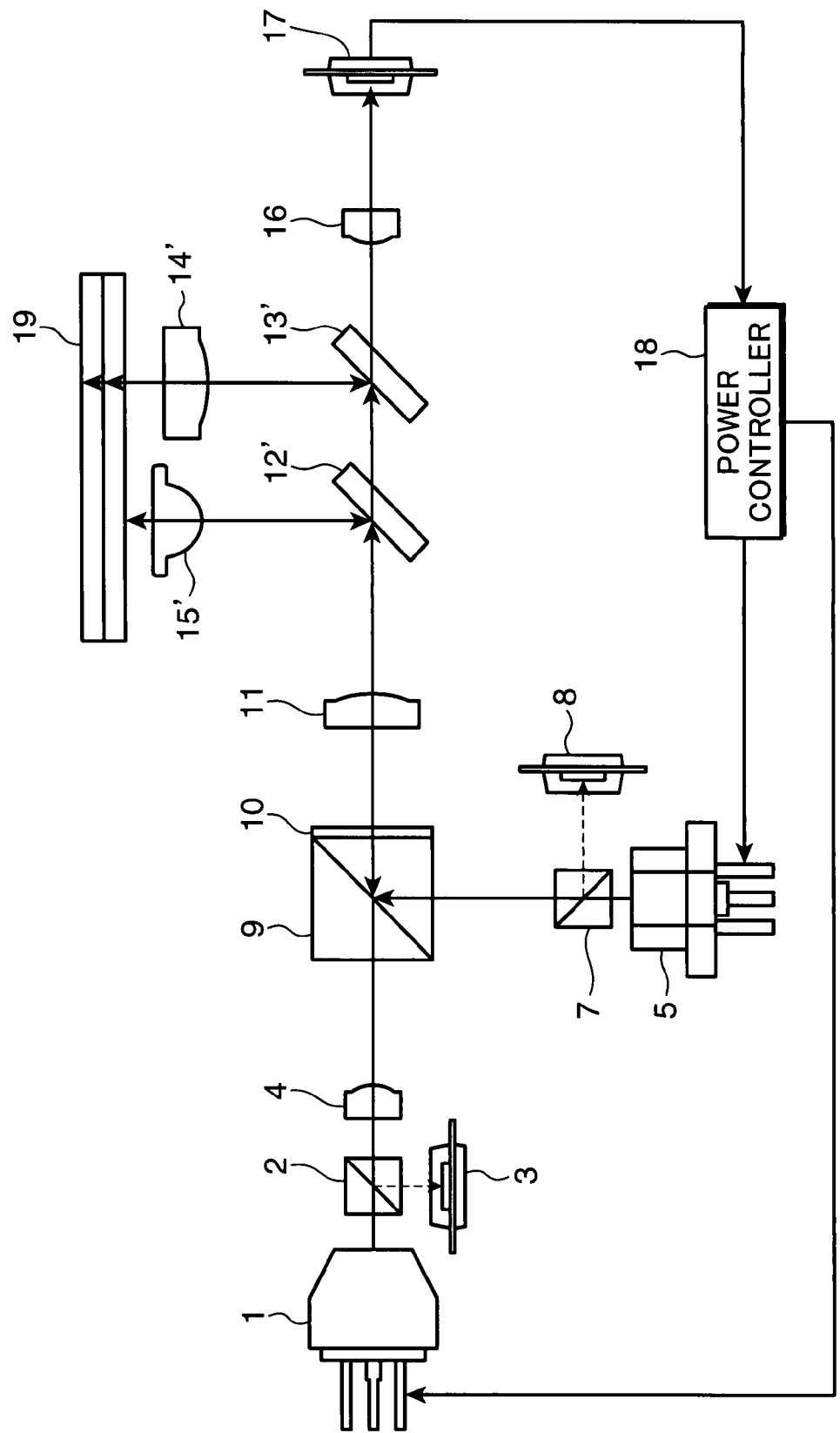
FIG. 5 is a diagram showing an arrangement of an optical pickup device in accordance with a second embodiment of the invention.

FIG. 5 is a diagram showing an arrangement of the optical pickup device in accordance with the second embodiment. Elements in FIG. 5 identical or substantially equivalent to those of the optical pickup device in accordance with the first embodiment are indicated by the same reference numerals, and description thereof is omitted herein, and merely an arrangement different from that in the first embodiment is described.

A first rise-up mirror 12' is a partly transmitting mirror for transmitting all of the first laser beam, all of the second laser beam, and part of the third laser beam that have been converted into a circularly polarized laser beam by a wideband quarter wavelength plate 10; and reflecting the remainder of the third laser beam toward the optical recording medium 19. For instance, the first rise-up mirror 12' has a characteristic that a transmittance Tp of a P-polarized component and a transmittance Ts of an S-polarized component in the first laser beam and the second laser beam are both 1 i.e. 100%; and a transmittance Tp of a P-polarized component and a transmittance Ts of an S-polarized component in the third laser beam are respectively a predetermined value and 0 i.e. 0%. In this embodiment, the first rise-up mirror 12' has a characteristic that the transmittance Tp of the P-polarized component and the transmittance Ts of the S-polarized component in the first laser beam and the second laser beam are both 100%, but ±20% margin of error is allowed. The first rise-up mirror 12' also has a characteristic that the transmittance Ts of the S-polarized component in the third laser beam is 0%, but ±20% margin of error is allowed.

The second rise-up mirror 13' is a partly transmitting mirror for transmitting part of the first laser beam, part of the second laser beam, and part or all of the third laser beam that have been transmitted through the first rise-up mirror 12' toward a photodetector 17; and reflecting the remainder of the first laser beam and the remainder of the second laser beam toward the optical recording medium 19. For instance, the second rise-up mirror 13' has a characteristic that a transmittance Tp of a P-polarized component and a transmittance Ts of an S-polarized component in the first laser beam and the second laser beam are respectively a predetermined value and 0 i.e. 0%; and a transmittance Tp of a P-polarized component and a transmittance Ts of an S-polarized component in the third laser beam are respectively a predetermined value and 0 i.e. 0%. In this embodiment, the second rise-up mirror 13' has a characteristic that the transmittance Ts of the S-polarized component in the first laser beam and the second laser beam, and the transmittance Ts of the S-polarized component in the third laser beam are all 0%, but ±20% margin of error is allowed.

A first objective lens 14' condenses the first laser beam or the second laser beam reflected on the second rise-up mirror 13' on the recording surface of the optical recording medium 19. A second objective lens 15' condenses the third laser beam reflected on the first rise-up mirror 12' on the recording surface of the optical recording medium 19.

An operation of the optical pickup device in the second embodiment is described referring to FIG. 5. First, laser power control in the case where a laser beam is outputted from a first light source 1 is described. Since the operation of the first laser beam as the infrared ray, and the operation of the second laser beam as the red ray are the same, the operation of the first laser beam is described as a representative in the following. Also, since the operation in the second embodiment until the first laser beam is incident onto the first rise-up mirror 12' is the same as the operation in the first embodiment until the first laser beam is incident onto the first rise-up mirror 12, description thereof is omitted herein.

The first rise-up mirror 12' transmits all of the incident first laser beam toward the second rise-up mirror 13'. The first laser beam transmitted through the first rise-up mirror 12' is incident onto the second rise-up mirror 13'. The second rise-up mirror 13' transmits part of the incident first laser beam toward a condenser lens 16, and reflects the remainder of the first laser beam toward the first objective lens 14'.

The condenser lens 16 condenses part of the first laser beam transmitted through the second rise-up mirror 13' on the photodetector 17. The photodetector 17 receives part of the first laser beam, and outputs an electric signal i.e. a light intensity signal in accordance with a light intensity of the received laser beam to a power controller 18. The power controller 18 controls the laser output of the first light source 1 in accordance with the light intensity signal outputted from the photodetector 17.

On the other hand, the first laser beam reflected on the second rise-up mirror 13' is incident onto the first objective lens 14'. The first objective lens 14' condenses the first laser beam on the recording surface of the optical recording medium 19. The laser beam reflected on the recording surface of the optical recording medium 19 transmits through the first objective lens 14' again, and incident onto the second rise-up mirror 13'. The second rise-up mirror 13' reflects the reflected laser beam toward the first rise-up mirror 12'. The reflected laser beam transmitted through the first rise-up mirror 12' is incident onto a collimator lens 11.

Since the operation in the second embodiment after the first laser beam reflected on the optical recording medium 19 is incident onto the collimator lens 11 is the same as the operation in the first embodiment after the first laser beam reflected on the optical recording medium 19 is incident onto the collimator lens 11, description thereof is omitted herein.

In the following, laser power control in the case where a laser beam is outputted from a second light source 5 is described. Since the operation in the second embodiment until the third laser beam is incident onto the first rise-up mirror 12' is the same as the operation in the first embodiment until the third laser beam is incident onto the first rise-up mirror 12, description thereof is omitted herein.

The first rise-up mirror 12' transmits part of the incident third laser beam toward the second rise-up mirror 13', and reflects the remainder of the third laser beam toward the second objective lens 15'. Part of the third laser beam transmitted through the first rise-up mirror 12' is incident onto the second rise-up mirror 13'. The second rise-up mirror 13' transmits part of the incident third laser beam toward the condenser lens 16.

The remainder of the third laser beam that has not been transmitted through the second rise-up mirror 13' is reflected toward the first objective lens 14'. However, there is no likelihood that the first objective lens 14' may condense the third laser beam on the recording surface of the optical recording medium 19. Accordingly, there is no likelihood that the third laser beam reflected toward the first objective lens 14' may be reflected on the optical recording medium 19.

In this embodiment, the second rise-up mirror 13' transmits part of the third laser beam transmitted through the first rise-up mirror 12'. Alternatively, the second rise-up mirror 13' may transmit all of the third laser beam transmitted through the first rise-up mirror 12'.

The condenser lens 16 condenses part of the third laser beam transmitted through the second rise-up mirror 13' on the photodetector 17. The photodetector 17 receives part of the third laser beam, and outputs an electric signal i.e. a light intensity signal in accordance with the light intensity of the received third laser beam to the power controller 18. The power controller 18 controls the laser output of the second light source 5 in accordance with the light intensity signal outputted from the photodetector 17.

On the other hand, the third laser beam reflected on the first rise-up mirror 12' is incident onto the second objective lens 15'. The second objective lens 15' condenses the third laser beam on the recording surface of the optical recording medium 19. Then, the laser beam reflected on the recording surface of the optical recording medium 19 is transmitted through the second objective lens 15' again, and incident onto the first rise-up mirror 12'. The first rise-up mirror 12' reflects the reflected laser beam toward the collimator lens 11.

Since the operation in the second embodiment after the third laser beam reflected on the optical recording medium 19 is incident onto the collimator lens 11 is the same as the operation in the first embodiment after the reflected laser beam is incident onto the collimator lens 11, description thereof is omitted herein.

As described above, the first light source 1 outputs the first laser beam of the first wavelength λ1, and the second laser beam of the second wavelength λ2 shorter than the first wavelength λ1. The second light source 5 outputs the third laser beam of the third wavelength λ3 shorter than the second wavelength λ2. The first laser beam is converted into a first circularly polarized laser beam, the second laser beam is converted into a second circularly polarized laser beam, and the third laser beam is converted into a third circularly polarized laser beam. Then, the first rise-up mirror 12' transmits all of the first laser beam, all of the second laser beam, and part of the third laser beam that have been converted into a circularly polarized laser beam, and reflects the remainder of the third laser beam toward the optical recording medium 19. The second rise-up mirror 13' transmits part of the first laser beam, part of the second laser beam, and all of the third laser beam that have been transmitted through the first rise-up mirror 12', and reflects the remainder of the first laser beam and the remainder of the second laser beam toward the optical recording medium 19.

Further, the first rise-up mirror 12' transmits all of the P-polarized component and all of the S-polarized component in the first laser beam and the second laser beam, transmits part of the P-polarized component in the third laser beam, and reflects all of the S-polarized component in the third laser beam toward the optical recording medium 19. The second rise-up mirror 13' transmits part of the P-polarized component in the first laser beam and the second laser beam, transmits part of the P-polarized component in the third laser beam, and reflects all of the S-polarized component in the third laser beam toward the optical recording medium 19.

In the above arrangement, the third laser beam of the third wavelength λ3 shorter than the second wavelength λ2 is guided to the optical recording medium 19 by the first rise-up mirror 12'. The first laser beam of the first wavelength λ1, and the second laser beam of the second wavelength λ2 shorter than the first wavelength λ1 are guided to the optical recording medium 19 by the second rise-up mirror 13'. The first laser beam, the second laser beam, and the third laser beam are guided to the photodetector 17.

Figure 6:
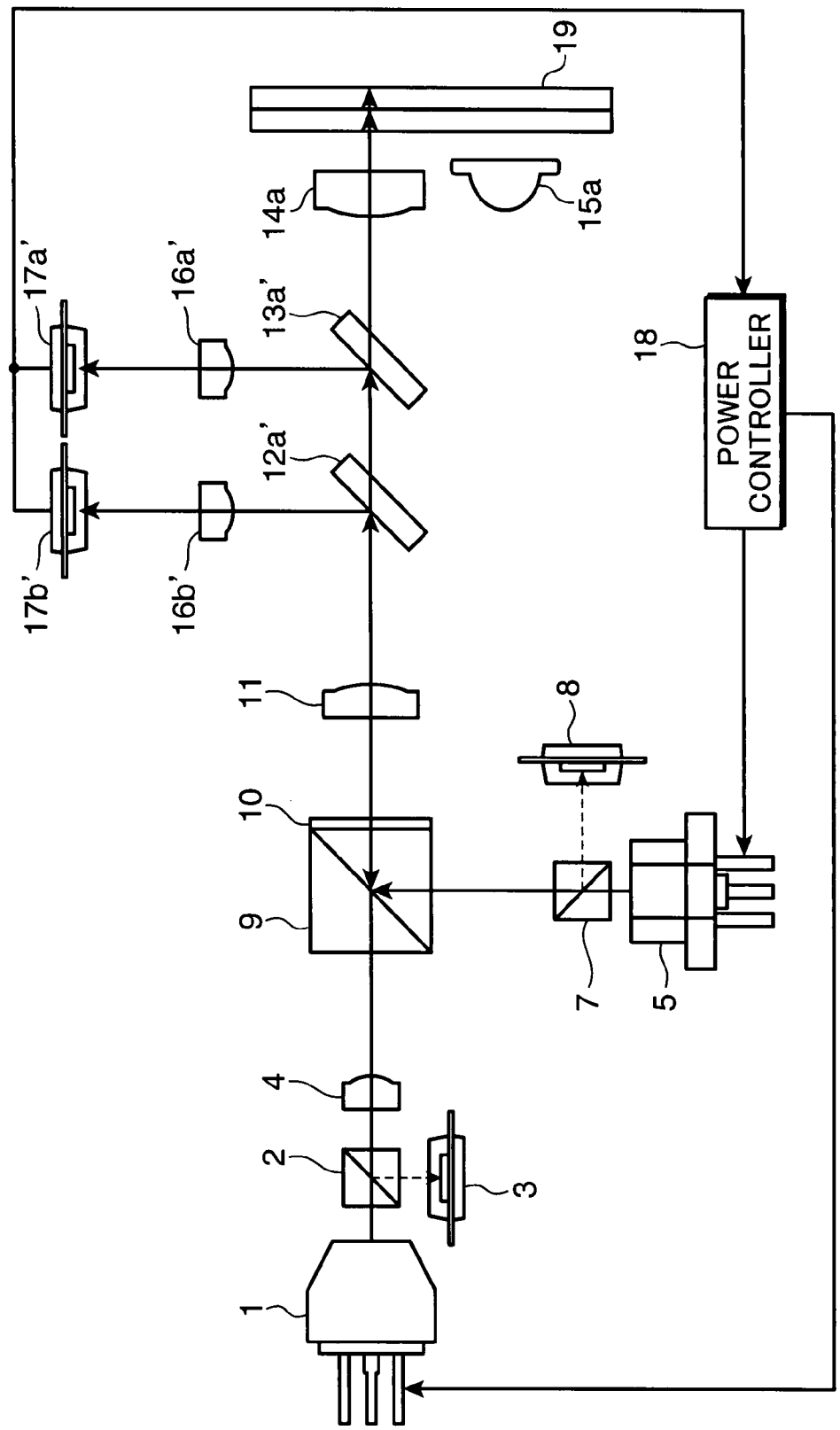
FIG. 6 is a diagram showing an arrangement of an optical pickup device as a modification of the second embodiment.

In this embodiment, the first rise-up mirror 12' and the second rise-up mirror 13' each is a partly transmitting mirror. Alternatively, the first rise-up mirror 12' and the second rise-up mirror 13' each may be a partly reflecting mirror. FIG. 6 is a diagram showing an arrangement of an optical pickup device as a modification of the second embodiment. Elements in FIG. 6 identical or substantially equivalent to those of the optical pickup device in FIG. 5 are indicated by the same reference numerals, and description thereof is omitted herein, and merely an arrangement different from that in the second embodiment is described.

A first rise-up mirror 12a' is a partly reflecting mirror for reflecting part of a third laser beam which has been converted into a circularly polarized laser beam by a wideband quarter wavelength plate 10 toward a second photodetector 17b'; and transmitting all of a first laser beam and all of a second laser beam that have been converted into a circularly polarized laser beam by the wideband quarter wavelength plate 10, and the remainder of the third laser beam toward the optical recording medium 19.

The first rise-up mirror 12a' has a characteristic that a reflectance Rp of a P-polarized component and a reflectance Rs of an S-polarized component in the first laser beam and the second laser beam are both 0 i.e. 0%; and a reflectance Rp of a P-polarized component and a reflectance Rs of an S-polarized component in the third laser beam are respectively 0 i.e. 0% and a predetermined value. In the modification, the first rise-up mirror 12a' has a characteristic that the reflectance Rp of the P-polarized component and the reflectance Rs of the S-polarized component in the first laser beam and the second laser beam, and the reflectance Rp of the P-polarized component in the third laser beam are all 0%, but ±20% margin of error is allowed.

A second rise-up mirror 13a' is a partly reflecting mirror for reflecting part of the first laser beam and part of the second laser beam that have been transmitted through the first rise-up mirror 12a' toward a first photodetector 17a'; and transmitting the remainder of the first laser beam and the remainder of the second laser beam, and all of the third laser beam that has been transmitted through the first rise-up mirror 12a' toward the optical recording medium 19.

The second rise-up mirror 13a' has a characteristic that a reflectance Rp of a P-polarized component and a reflectance Rs of an S-polarized component in the first laser beam and the second laser beam are respectively 0 i.e. 0% and a predetermined value; and a reflectance Rp of a P-polarized component and a reflectance Rs of an S-polarized component in the third laser beam are respectively 0 i.e. 0% and a predetermined value. In the modification, the second rise-up mirror 13a' has a characteristic that the reflectance Rp of the P-polarized component in the first laser beam and the second laser beam, and the reflectance Rp of the P-polarized component in the third laser beam are all 0%, but ±20% margin of error is allowed.

In the modification, the first photodetector 17a' for detecting the first laser beam and the second laser beam is arranged at the position corresponding to the first objective lens 14' in the second embodiment, and the second photodetector 17b' for detecting the third laser beam is arranged at the position corresponding to the second objective lens 15' in the second embodiment. Also, the optical pickup device in the modification includes a first objective lens 14a for condensing the first laser beam and the second laser beam, and a second objective lens 15a for condensing the third laser beam, in place of the condenser lens 16 and the photodetector 17 in the second embodiment.

More specifically, the first objective lens 14a condenses the first laser beam or the second laser beam transmitted through the first rise-up mirror 12a' and the second rise-up mirror 13a' on the recording surface of the optical recording medium 19. The second objective lens 15a condenses the third laser beam transmitted through the first rise-up mirror 12a' and the second rise-up mirror 13a' on the recording surface of the optical recording medium 19. The first objective lens 14a and the second objective lens 15a are movable in a direction perpendicularly intersecting with an optical axis of the laser beam by an unillustrated motor. In the case where the first laser beam or the second laser beam is condensed on the recording surface of the optical recording medium 19, the motor is driven to move the first objective lens 14a on the optical axis. In the case where the third laser beam is condensed on the recording surface of the optical recording medium 19, the motor is driven to move the second objective lens 15a on the optical axis.

A condenser lens 16a' condenses the first laser beam and the second laser beam reflected on the second rise-up mirror 13a' on the light receiving surface of the first photodetector 17a'. A condenser lens 16b' condenses the third laser beam reflected on the first rise-up mirror 12a' on the light receiving surface of the second photodetector 17b'.

In the modification, the optical pickup device is provided with the two photodetectors i.e. the first photodetector 17a' and the second photodetector 17b'. Alternatively, the optical pickup device may be provided with a single photodetector to detect the first laser beam, the second laser beam, and the third laser beam.

As described above, the first light source 1 outputs the first laser beam of the first wavelength λ1, and the second laser beam of the second wavelength λ2 shorter than the first wavelength λ1. The second light source 5 outputs the third laser beam of the third wavelength λ3 shorter than the second wavelength λ2. The first laser beam is converted into a first circularly polarized laser beam, the second laser beam is converted into a second circularly polarized laser beam, and the third laser beam is converted into a third circularly polarized laser beam. Then, the first rise-up mirror 12a' reflects part of the third laser beam that has been converted into a circularly polarized laser beam toward the second photodetector 17b', and transmits all of the first laser beam and all of the second laser beam that have been converted into a circularly polarized laser beam, and the remainder of the third laser beam. The second rise-up mirror 13a' reflects part of the first laser beam and part of the second laser beam that have been transmitted through the first rise-up mirror 12a' toward the first photodetector 17a', and transmits the remainder of the first laser beam and the remainder of the second laser beam, and all of the third laser beam that has been transmitted through the first rise-up mirror 12a' toward the optical recording medium 19.

In the above operation, the first rise-up mirror 12a' transmits all of the P-polarized component and all of the S-polarized component in the first laser beam and the second laser beam, transmits all of the P-polarized component in the third laser beam, and reflects part of the S-polarized component in the third laser beam toward the second photodetector 17b'. The second rise-up mirror 13a' transmits all of the P-polarized component in the first laser beam and the second laser beam toward the optical recording medium 19, reflects part of the S-polarized component in the first laser beam and the second laser beam toward the first photodetector 17a', and reflects all of the P-polarized component in the third laser beam toward the optical recording medium 19.

In the above arrangement, the third laser beam of the third wavelength λ3 shorter than the second wavelength λ2 is guided to the second photodetector 17b' by the first rise-up mirror 12a'. The first laser beam of the first wavelength λ1, and the second laser beam of the second wavelength λ2 shorter than the first wavelength λ1 are guided to the first photodetector 17a' by the second rise-up mirror 13a'. The first laser beam, the second laser beam, and the third laser beam are guided to the optical recording medium 19.

In this embodiment, the first rise-up mirror 12' reflects a blue ray for BD toward the second objective lens 15', and the second rise-up mirror 13' reflects a red ray for DVD and an infrared ray for CD toward the first objective lens 14'. Alternatively, for instance, the first rise-up mirror 12' may reflect a blue ray for BD toward the second objective lens 15', and the second rise-up mirror 13' may reflect a red ray for DVD, an infrared ray for CD, and a blue ray for HD DVD toward the first objective lens 14'. Further alternatively, for instance, the first rise-up mirror 12' may reflect a blue ray for BD and a blue ray for HD DVD toward the second objective lens 15', and the second rise-up mirror 13' may reflect a red ray for DVD and an infrared ray for CD toward the first objective lens 14'.

The optical pickup device in this embodiment is provided with the first rise-up mirror 12' for reflecting a blue ray toward the second objective lens 15', and the second rise-up mirror 13' for reflecting a red ray and an infrared ray toward the first objective lens 14'. Alternatively, the optical pickup device may be provided with a single rise-up mirror for reflecting rays of three different wavelengths i.e. a red ray, an infrared ray, and a blue ray toward an objective lens.

Third Embodiment

In this section, an optical pickup device in accordance with a third embodiment of the invention is described. The optical pickup device in the first embodiment has a feature that the photodetector 17 is disposed on the same plane as the first light source 1, the beam splitter 2, the relay lens 4, the beam splitter 9, the wideband quarter wavelength plate 10, the collimator lens 11, the first rise-up mirror 12, and the second rise-up mirror 13, and that the photodetector 17 has the light receiving surface at a position perpendicularly intersecting with the optical axis. On the other hand, the optical pickup device in accordance with the third embodiment has a feature that a photodetector 17 has a light receiving surface at a position in parallel with a plane where a first light source 1, a beam splitter 2, a relay lens 4, a beam splitter 9, a wideband quarter wavelength plate 10, a collimator lens 11, a first rise-up mirror 12, and a second rise-up mirror 13 are arranged.

Figure 7:
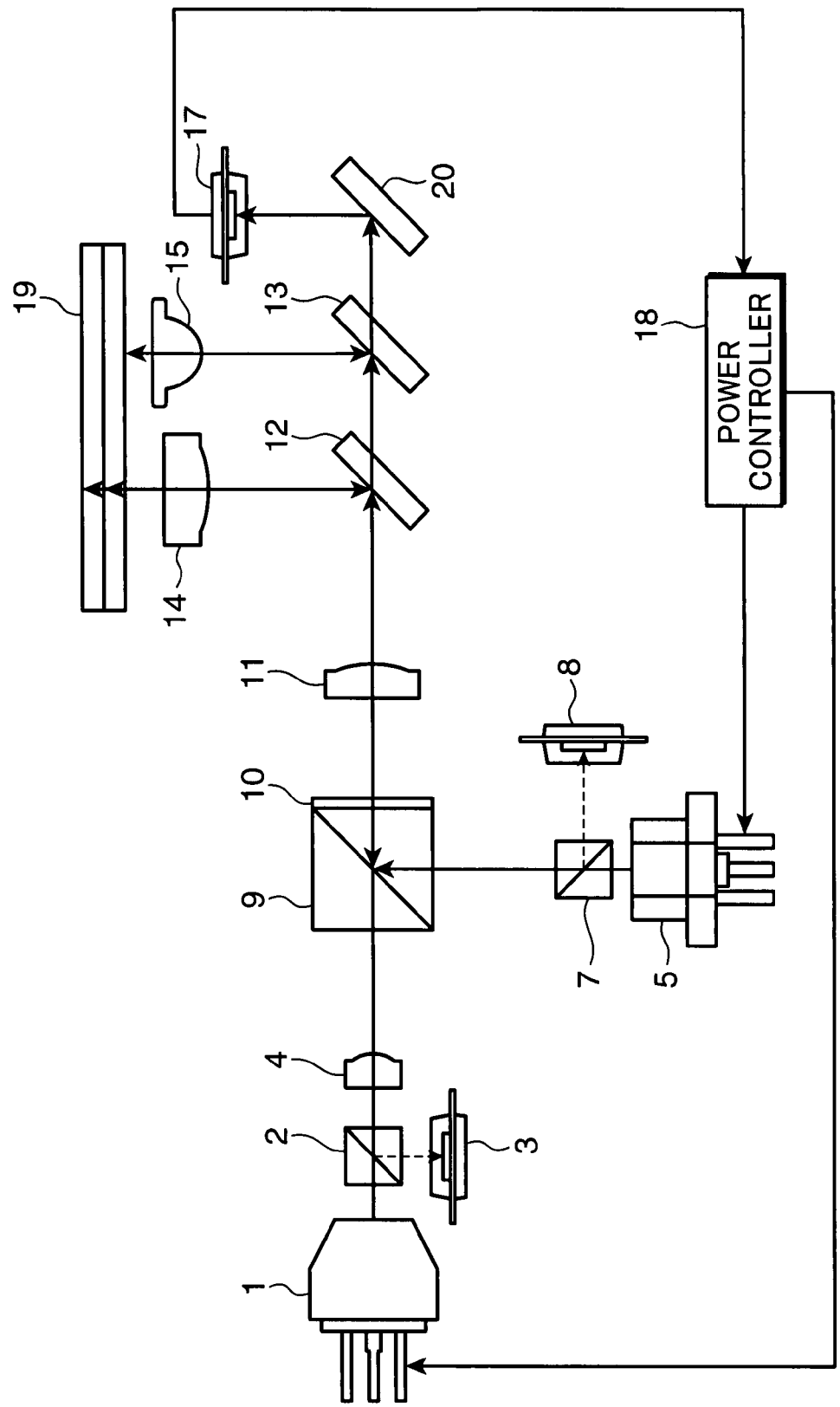
FIG. 7 is a diagram showing an arrangement of an optical pickup device in accordance with a third embodiment of the invention.

FIG. 7 is a diagram showing an arrangement of the optical pickup device in accordance with the third embodiment. Elements in FIG. 7 identical or substantially equivalent to those of the optical pickup device in the first embodiment are indicated by the same reference numerals, and description thereof is omitted herein, and merely an arrangement different from that in the first embodiment is described.

A reflection mirror 20 reflects a first laser beam, a second laser beam, and a third laser beam that have been transmitted through the first rise-up mirror 12 and the second rise-up mirror 13 toward the light receiving surface of the photodetector 17, and condenses the first laser beam, the second laser beam, and the third laser beam on the light receiving surface of the photodetector 17.

The photodetector 17 has the light receiving surface aligned in parallel with the plane where the first light source 1, the beam splitter 2, the relay lens 4, the beam splitter 9, the wideband quarter wavelength plate 10, the collimator lens 11, the first rise-up mirror 12, and the second rise-up mirror 13 are arranged to receive the first laser beam, the second laser beam, and the third laser beam reflected on the reflection mirror 20.

Since the operation of the optical pickup device in the third embodiment is the same as the operation of the optical pickup device in the first embodiment except that the first laser beam, the second laser beam, and the third laser beam are reflected on the reflection mirror 20, description on the same operation is omitted herein.

As described above, the light receiving surface of the photodetector 17 for receiving a laser beam is aligned in parallel with the recording surface of the optical recording medium 19, and the laser beam guided by the second rise-up mirror 13 is reflected toward the photodetector 17. Accordingly, the light receiving surface of the photodetector 17 can be disposed in parallel with the recording surface of the optical recording medium 19, unlike an arrangement that the light receiving surface of the photodetector 17 is oriented in a direction perpendicularly intersecting with the optical axis of the laser beam to be guided by the second rise-up mirror 13. This arrangement enables to reduce the thickness of the optical pickup device.

In this embodiment, the first rise-up mirror 12 reflects a red ray for DVD and an infrared ray for CD toward a first objective lens 14, and the second rise-tip mirror 13 reflects a blue ray for BD toward a second objective lens 15. Alternatively, for instance, the first rise-up mirror 12 may reflect a red ray for DVD, an infrared ray for CD, and a blue ray for HD DVD toward the first objective lens 14, and the second rise-up mirror 13 may reflect a blue ray for BD toward the second objective lens 15. Further alternatively, for instance, the first rise-up mirror 12 may reflect a red ray for DVD and an infrared ray for CD toward the first objective lens 14, and the second rise-up mirror 13 may reflect a blue ray for BD and a blue ray for HD DVD toward the second objective lens 15.

The optical pickup device in this embodiment is provided with the first rise-up mirror 12 for reflecting a red ray and an infrared ray toward the first objective lens 14, and the second rise-up mirror 13 for reflecting a blue ray toward the second objective lens 15. Alternatively, the optical pickup device may be provided with a single rise-up mirror for reflecting laser beams of three different wavelengths i.e. a red ray, an infrared ray, and a blue ray toward an objective lens.

Fourth Embodiment

In this section, an optical pickup device in accordance with a fourth embodiment is described. In the first embodiment, the wideband quarter wavelength plate 10 for converting the first laser beam, the second laser beam, and the third laser beam into a circularly polarized laser beam is disposed between the beam splitter 9 and the collimator lens 11. On the other hand, in the fourth embodiment, the optical pickup device has two quarter wavelength plates respectively adapted for converting a first laser beam and a second laser beam into a circularly polarized laser beam, and converting a third laser beam into a circularly polarized laser beam.

Figure 8:
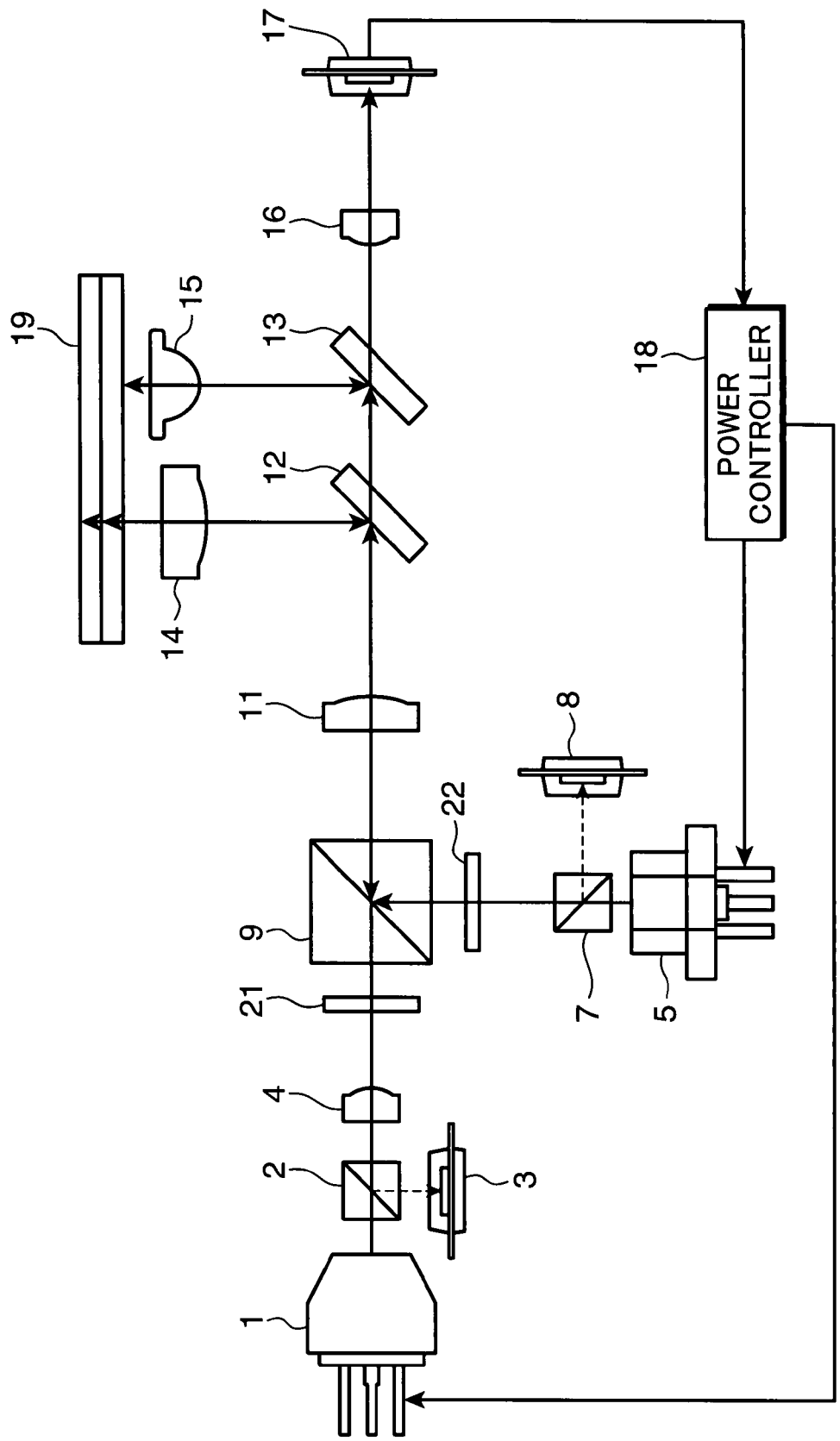
FIG. 8 is a diagram showing an arrangement of an optical pickup device in accordance with a fourth embodiment of the invention.

FIG. 8 is a diagram showing an arrangement of the optical pickup device in accordance with the fourth embodiment. Elements in FIG. 8 identical or substantially equivalent to those of the optical pickup device in the first embodiment are indicated by the same reference numerals, and description thereof is omitted herein, and merely an arrangement different from that in the first embodiment is described.

A first quarter wavelength plate 21 is disposed between a relay lens 4 and a beam splitter 9 to convert two laser beams of different wavelengths from each other i.e. a first laser beam and a second laser beam into a circularly polarized laser beam. A second quarter wavelength plate 22 is disposed between a beam splitter 7 and the beam splitter 9 to convert a third laser beam into a circularly polarized laser beam.

In the following, an operation of the optical pickup device in accordance with the fourth embodiment is described. First, laser power control in the case where a laser beam is outputted from a first light source 1 is described. Since the operation in the fourth embodiment until the first laser beam or the second laser beam is incident onto the relay lens 4 is the same as the operation in the first embodiment until the first laser beam is incident onto the relay lens 4, description thereof is omitted herein.

The first laser beam or the second laser beam transmitted through the relay lens 4 is incident onto the first quarter wavelength plate 21. The first quarter wavelength plate 21 converts the incident first laser beam or second laser beam from a linearly polarized laser beam into a circularly polarized laser beam. The first laser beam or the second laser beam which has been converted into a circularly polarized laser beam by the first quarter wavelength plate 21 is incident onto the beam splitter 9. The beam splitter 9 transmits the incident first laser beam or second laser beam. The first laser beam or the second laser beam that has been transmitted through the beam splitter 9 is incident onto a collimator lens 11.

Since the operation in the fourth embodiment after the first laser beam or the second laser beam is incident onto the collimator lens 11 is the same as the operation in the first embodiment after the first laser beam is incident onto the collimator lens 11, description thereof is omitted herein. The laser beam reflected on the recording surface of the optical recording medium 19 is transmitted through the beam splitter 9, and incident onto the first quarter wavelength plate 21. The first quarter wavelength plate 21 converts the reflected laser beam from a circularly polarized laser beam into a linearly polarized laser beam. The reflected laser beam that has been converted into a linearly polarized laser beam is incident onto the relay lens 4. Since the operation in the fourth embodiment after the reflected laser beam is incident onto the relay lens 4 is the same as the operation in the first embodiment after the reflected laser beam is incident onto the relay lens 4, description thereof is omitted herein.

Next, laser power control in the case where a laser beam is outputted from a second light source 5 is described. Since the operation in the fourth embodiment until the third laser beam is transmitted through the beam splitter 7 is the same as the operation in the first embodiment until the third laser beam is transmitted through the beam splitter 7, description thereof is omitted herein.

The third laser beam transmitted through the beam splitter 7 is incident onto the second quarter wavelength plate 22. The second quarter wavelength plate 22 converts the incident third laser beam from a linearly polarized laser beam into a circularly polarized laser beam. The third laser beam which has been converted into a circularly polarized laser beam by the second quarter wavelength plate 22 is incident onto the beam splitter 9. The beam splitter 9 reflects the incident third laser beam toward the collimator lens 11. The third laser beam reflected on the beam splitter 9 is incident onto the collimator lens 11.

Since the operation in the fourth embodiment after the third laser beam is incident onto the collimator lens 11 is the same as the operation in the first embodiment after the third laser beam is incident onto the collimator lens 11, description thereof is omitted herein. The laser beam reflected on the recording surface of the optical recording medium 19 is reflected on the beam splitter 9, and incident onto the second quarter wavelength plate 22. The second quarter wavelength plate 22 converts the reflected laser beam from a circularly polarized laser beam into a linearly polarized laser beam. The reflected beam that has been converted into a linearly polarized laser beam is incident onto the beam splitter 7. Since the operation in the fourth embodiment after the reflected laser beam is incident onto the beam splitter 7 is the same as the operation in the first embodiment after the reflected laser beam is incident onto the beam splitter 7, description thereof is omitted herein.

As described above, the first quarter wavelength plate 21 for converting the first laser beam and the second laser beam into a circularly polarized laser beam, and the second quarter wavelength plate 22 for converting the third laser beam into a circularly polarized laser beam are provided individually. This arrangement enables to produce an optical pickup device with a low cost, as compared with an arrangement that a single wideband quarter wavelength plate for converting the first laser beam, the second laser beam, and the third laser beam into a circularly polarized laser beam is used.

In this embodiment, a first rise-up mirror 12 reflects a red ray for DVD and an infrared ray for CD toward a first objective lens 14, and a second rise-up mirror 13 reflects a blue ray for BD toward a second objective lens 15. Alternatively, for instance, the first rise-up mirror 12 may reflect a red ray for DVD, an infrared ray for CD, and a blue ray for HD DVD toward the first objective lens 14, and the second rise-up mirror 13 may reflect a blue ray for BD toward the second objective lens 15. Further alternatively, for instance, the first rise-up mirror 12 may reflect a red ray for DVD and an infrared ray for CD toward the first objective lens 14, and the second rise-up mirror 13 may reflect a blue ray for BD and a blue ray for HD DVD toward the second objective lens 15.

The optical pickup device in this embodiment is provided with the first rise-up mirror 12 for reflecting a red ray and an infrared ray toward the first objective lens 14, and the second rise-up mirror 13 for reflecting a blue ray toward the second objective lens 15. Alternatively, the optical pickup device may be provided with a single rise-up mirror for reflecting laser beams of three different wavelengths i.e. a red ray, an infrared ray, and a blue ray toward an objective lens.

Fifth Embodiment

In this section, an optical pickup device in accordance with a fifth embodiment of the invention is described. Whereas the optical pickup device in the first embodiment is provided with the two light sources and the two rise-up mirrors, the optical pickup device in the fifth embodiment is provided with a single light source and a single rise-up mirror.

Figure 9:
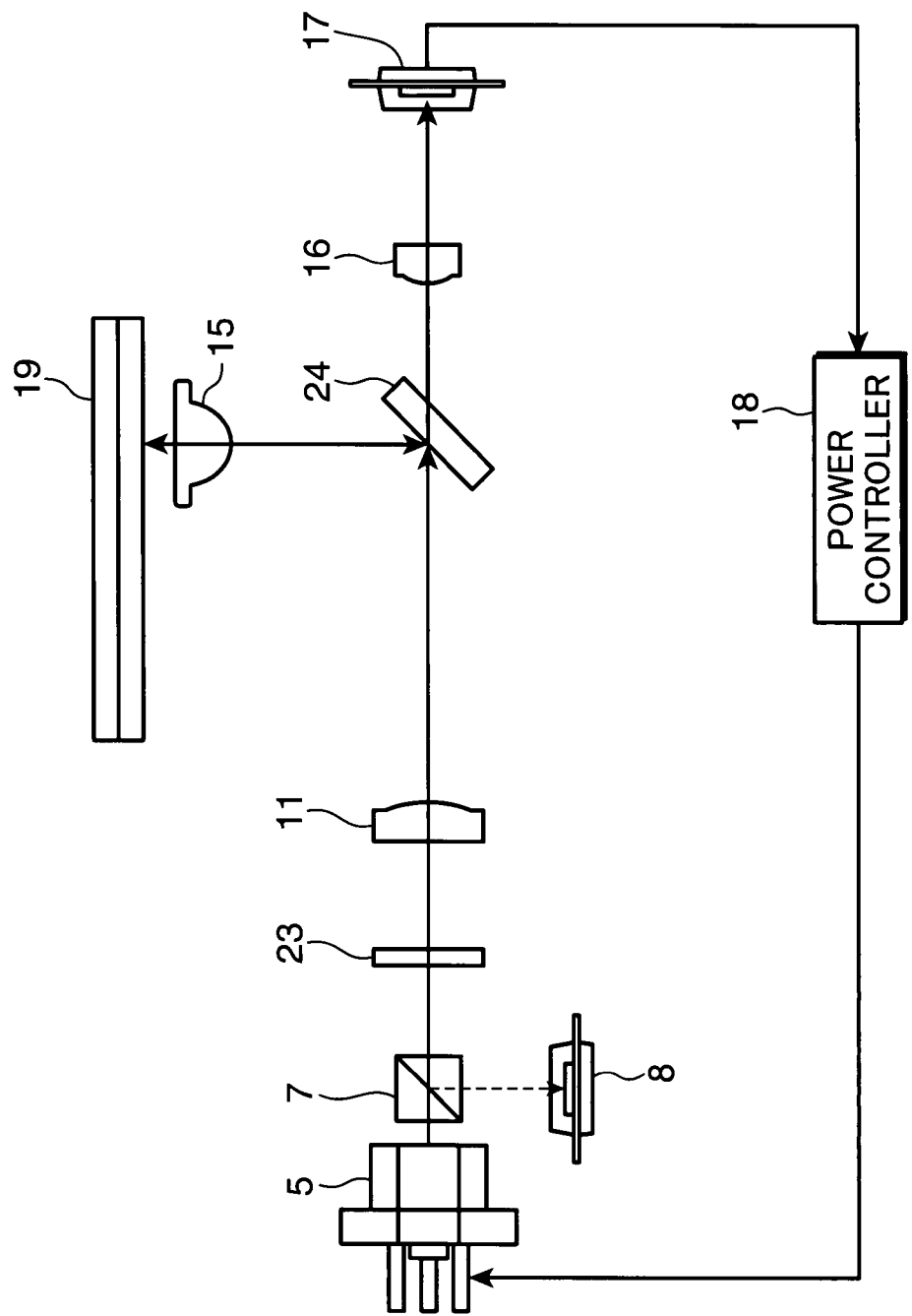
FIG. 9 is a diagram showing an arrangement of an optical pickup device in accordance with a fifth embodiment of the invention.

FIG. 9 is a diagram showing an arrangement of the optical pickup device in accordance with the fifth embodiment. The optical pickup device shown in FIG. 9 includes a second light source 5, a beam splitter 7, a second signal detector 8, a collimator lens 11, a second objective lens 15, a condenser lens 16, a photodetector 17, a power controller 18, a quarter wavelength plate 23, and a rise-up mirror 24. Elements in FIG. 9 identical or substantially equivalent to those of the optical pickup device in the first embodiment are indicated by the same reference numerals, and description thereof is omitted herein, and merely an arrangement different from that in the first embodiment is described.

The quarter wavelength plate 23 converts a third laser beam from a linearly polarized laser beam into a circularly polarized laser beam. The rise-up mirror 24 is a partly transmitting mirror for transmitting part of the third laser beam toward the photodetector 17, and reflecting the remainder of the third laser beam toward the optical recording medium 19. For instance, the rise-up mirror 24 is designed in such a manner that a transmittance Tp of a P-polarized component in the third laser beam is larger than a transmittance Ts of an S-polarized component in the third laser beam.

In the following, an operation of the optical pickup device in accordance with the fifth embodiment is described. Since the operation in the fifth embodiment until the third laser beam is transmitted through the beam splitter 7 is the same as the operation in the first embodiment until the third laser beam is transmitted through the beam splitter 7, description thereof is omitted herein.

The third laser beam transmitted through the beam splitter 7 is incident onto the quarter wavelength plate 23. The quarter wavelength plate 23 converts the incident third laser beam from a linearly polarized laser beam into a circularly polarized laser beam. The third laser beam which has been converted into a circularly polarized laser beam by the quarter wavelength plate 23 is incident onto the collimator lens 11. The collimator lens 11 collimates the incident third laser beam into parallel beams. The third laser beam which has been converted into parallel beams by the collimator lens 11 is incident onto the rise-up mirror 24.

Figure 10:
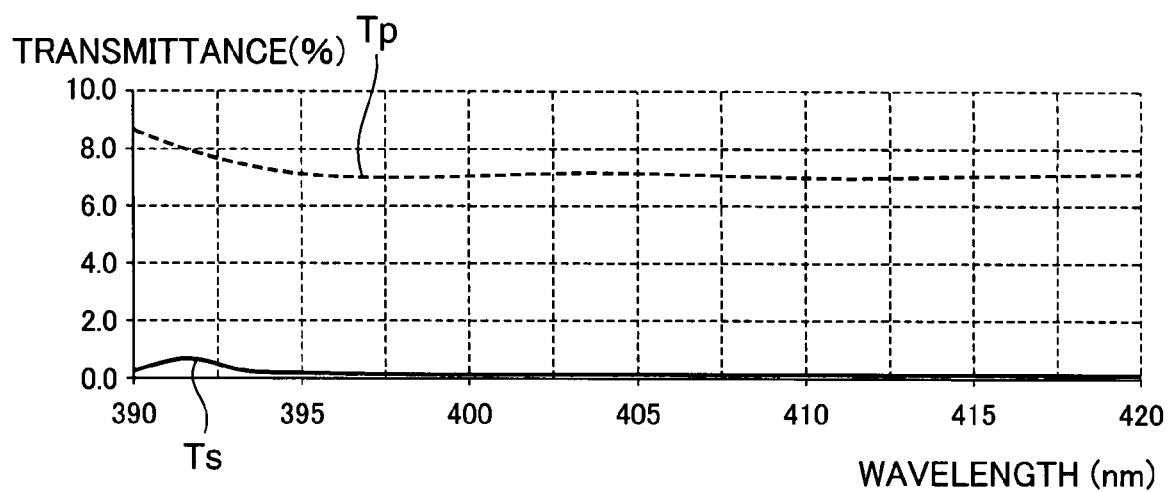
FIG. 10 is a diagram showing a relation between the wavelength of a laser beam to be incident onto a rise-up mirror, and the transmittance of the rise-up mirror in the fifth embodiment.

The rise-up mirror 24 transmits part of the incident third laser beam toward the condenser lens 16, and reflects the remainder of the incident third laser beam toward the second objective lens 15. FIG. 10 is a diagram showing a relation between the wavelength of a laser beam to be incident onto the rise-up mirror, and the transmittance of the laser beam in this embodiment. In FIG. 10, the axis of abscissas indicates the wavelength of a laser beam, and the axis of ordinate represents the transmittance of the laser beam. In FIG. 10, the broken line represents the transmittance Tp of the P-polarized component, and the solid line represents the transmittance Ts of the S-polarized component. As shown in FIG. 10, the rise-up mirror 24 has a characteristic that the transmittance Tp of the P-polarized component and the transmittance Ts of the S-polarized component in the third laser beam of the third wavelength λ3 (=405 nm) are respectively 7% and 0%. In this embodiment, the rise-up mirror 24 has a characteristic that the transmittance Tp of the P-polarized component and the transmittance Ts of the S-polarized component in the third laser beam are respectively 0.07 i.e. 7% and 0 i.e. 0%. Alternatively, the transmittance Tp of the P-polarized component and the transmittance Ts of the S-polarized component in the third laser beam may be respectively 0.1 i.e. 10% and 0 i.e. 0%.

Referring back to FIG. 9, the condenser lens 16 condenses part of the third laser beam transmitted through the rise-up mirror 24 on the photodetector 17. The photodetector 17 receives part of the third laser beam, and outputs an electric signal i.e. a light intensity signal in accordance with a light intensity of the received third laser beam to a power controller 18. The power controller 18 controls the laser output of the second light source 5 in accordance with the light intensity signal outputted from the photodetector 17.

On the other hand, the third laser beam reflected on the rise-up mirror 24 is incident onto the second objective lens 15. The second objective lens 15 condenses the third laser beam on the recording surface of the optical recording medium 19. The laser beam reflected on the recording surface of the optical recording medium 19 is transmitted through the second objective lens 15 again, and incident onto the rise-up mirror 24. The rise-up mirror 24 reflects the reflected laser beam toward the collimator lens 11. The reflected laser beam that has been transmitted through the collimator lens 11 is converted from a circularly polarized laser beam into a linearly polarized laser beam by the quarter wavelength plate 23 for incidence onto the beam splitter 7. The beam splitter 7 reflects the reflected laser beam toward the second signal detector 8. The laser beam reflected on the beam splitter 7 is incident onto the second signal detector 8. The second signal detector 8 receives the laser beam reflected on the optical recording medium 19, converts the received laser beam into an electric signal, and detects various signals such as a focusing signal, a tracking signal, and an RF signal based on the electric signal. Then, controls such as focusing control and tracking control are performed based on the detected signals.

As described above, the rise-up mirror 24 as a partly transmitting mirror transmits the third laser beam that has been converted into a circularly polarized laser beam toward the photodetector 17, and reflects the third laser beam toward the optical recording medium 19. The rise-up mirror 24 has a characteristic that the transmittance Tp of the P-polarized component in the third laser beam is larger than the transmittance Ts of the S-polarized component in the third laser beam. Accordingly, the rise-up mirror 24 is capable of transmitting a larger amount of the P-polarized laser beam than the S-polarized laser beam to thereby guide the P-polarized laser beam toward the photodetector 17.

In this embodiment, the second light source 5 for outputting the third laser beam as a blue ray is used. Alternatively, a first light source 1 for outputting a first laser beam as an infrared ray, and a second laser beam as a red ray may be used.

Figure 11:
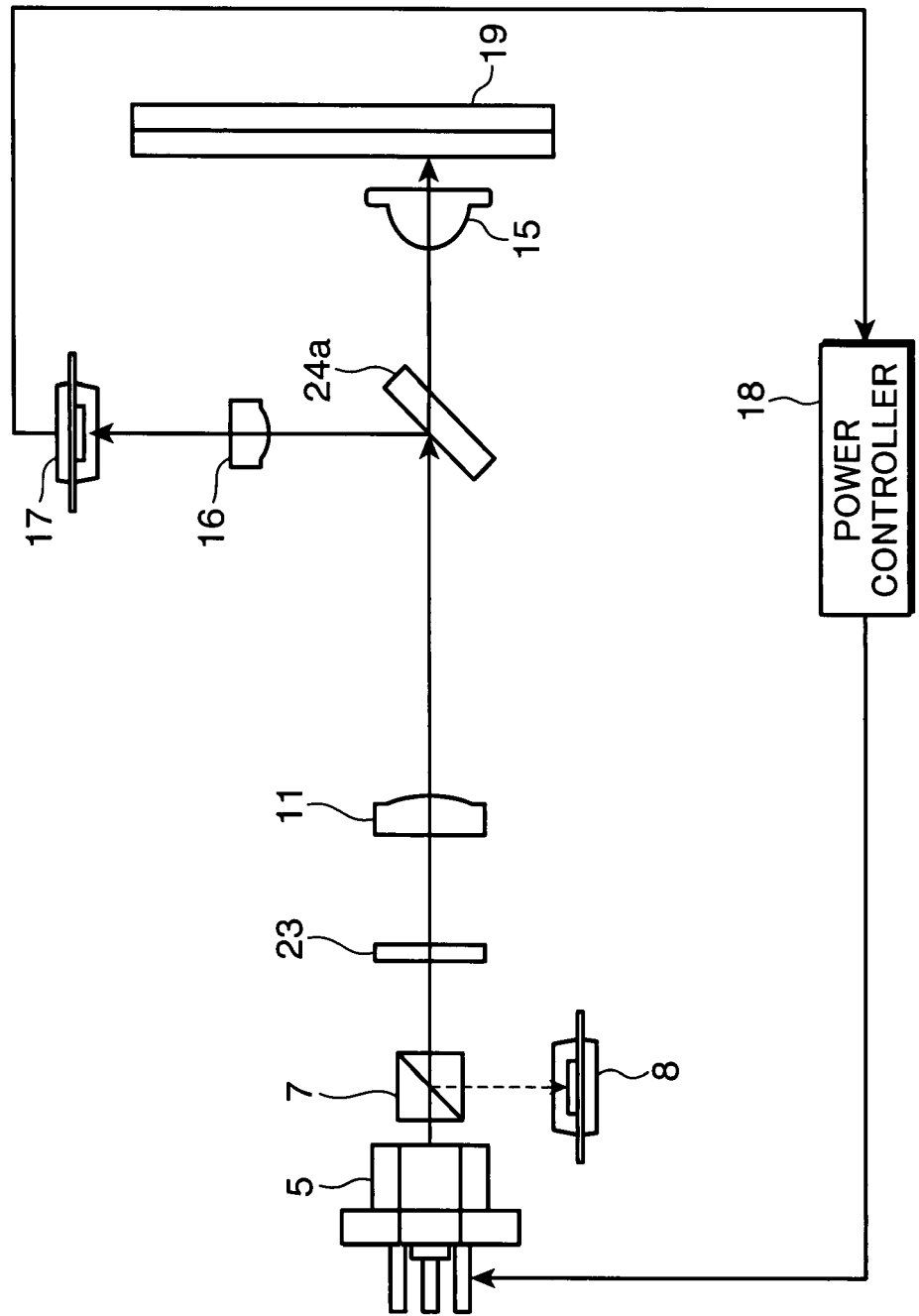
FIG. 11 is a diagram showing an arrangement of an optical pickup device as a modification of the fifth embodiment.

In this embodiment, the rise-up mirror 24 is a partly transmitting mirror. Alternatively, the rise-up mirror 24 may be a partly reflecting mirror. FIG. 11 is a diagram showing an arrangement of an optical pickup device as a modification of the fifth embodiment. Elements in FIG. 11 identical or substantially equivalent to those of the optical pickup device in FIG. 9 are indicated by the same reference numerals, and description thereof is omitted herein, and merely an arrangement different from that in the fifth embodiment is described.

A rise-up mirror 24a is a partly reflecting mirror for reflecting part of a third laser beam toward a photodetector 17, and transmitting the remainder of the third laser beam toward the optical recording medium 19. The rise-up mirror 24a is designed in such a manner that a reflectance Rs of an S-polarized component in the third laser beam is larger than a reflectance Rp of a P-polarized component in the third laser beam. For instance, the reflectance Rs of the S-polarized component is 0.1 i.e. 10%, and the reflectance Rp of the P-polarized component is 0 i.e. 0%.

A second rise-up mirror 15 condenses the third laser beam transmitted through the rise-up mirror 24a on the recording surface of the optical recording medium 19. A condenser lens 16 condenses the third laser beam reflected on the rise-up mirror 24a on the light receiving surface of the photodetector 17.

As described above, the rise-up mirror 24a as a partly reflecting mirror reflects a circularly polarized laser beam toward the photodetector 17, and transmits the circularly polarized laser beam toward the optical recording medium 19. The rise-up mirror 24a has a characteristic that the reflectance Rs of the S-polarized component is larger than the reflectance Rp of the P-polarized component. This arrangement enables to reflect a larger amount of the S-polarized laser beam than the P-polarized laser beam to thereby guide the S-polarized laser beam toward the photodetector 17.

Sixth Embodiment

In this section, an optical pickup device in accordance with a sixth embodiment of the invention is described. The optical pickup device in accordance with the sixth embodiment is additionally provided with a temperature sensor for detecting a temperature in the optical pickup device. A power controller corrects the power of a light source in accordance with the temperature detected by the temperature sensor.

Figure 12:
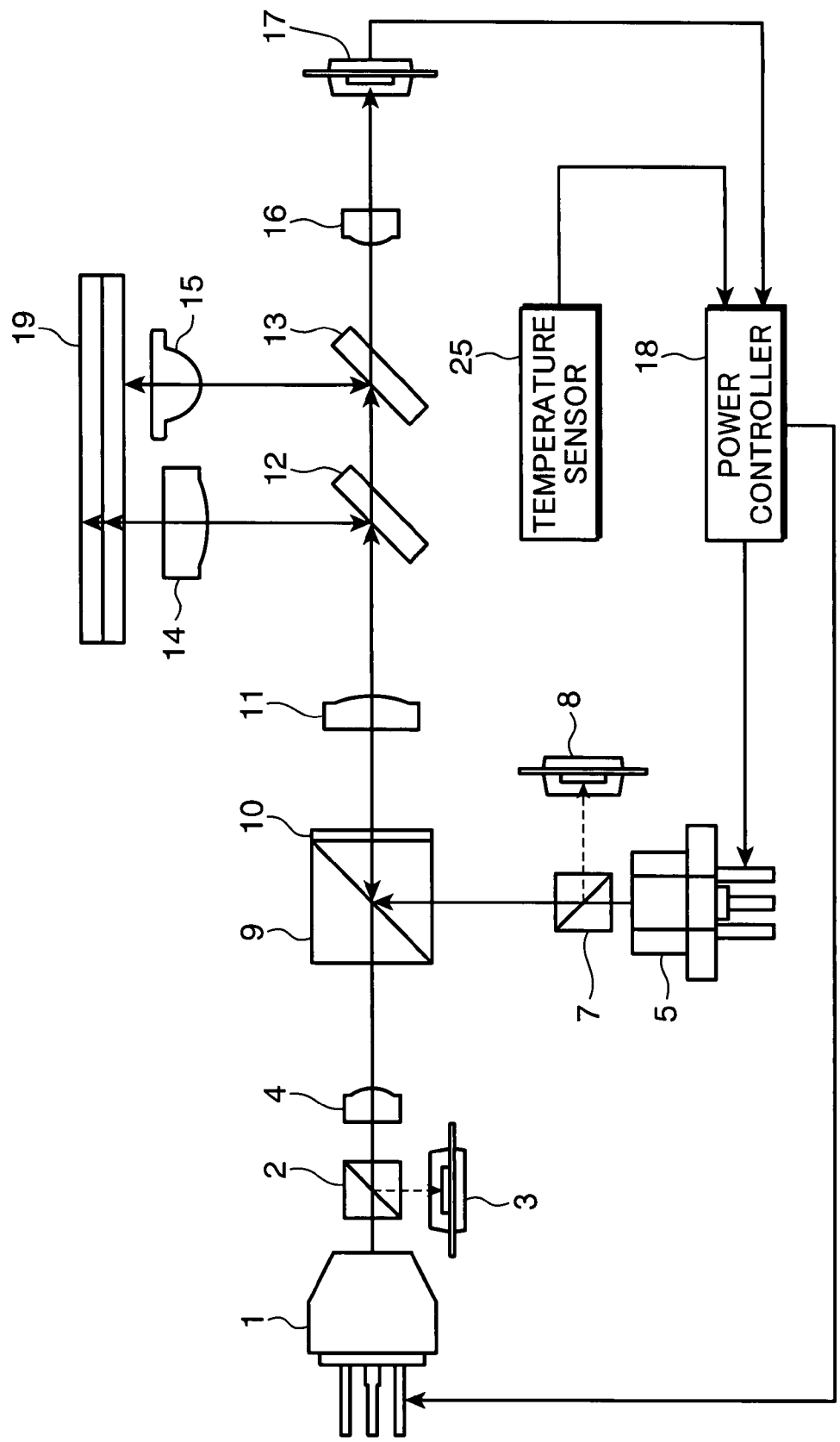
FIG. 12 is a diagram showing an arrangement of an optical pickup device in accordance with a sixth embodiment of the invention.

FIG. 12 is a diagram showing an arrangement of the optical pickup device in accordance with the sixth embodiment. Elements in FIG. 12 identical or substantially equivalent to those of the optical pickup device in the first embodiment are indicated by the same reference numerals, and description thereof is omitted herein, and merely an arrangement different from that in the first embodiment is described.

The optical pickup device in accordance with the sixth embodiment further includes a temperature sensor 25 in addition to the elements in the first embodiment. The temperature sensor 25 detects a temperature in the optical pickup device, and outputs the detected temperature to a power controller 18.

The power controller 18 corrects the laser output of a laser beam to be outputted from a first light source 1 and a second light source 5, based on the temperature detected by the temperature sensor 25. Specifically, a correction coefficient is predefined with respect to each of the temperatures, and the power controller 18 pre-stores the correction coefficients with respect to the temperatures. The power controller 18 reads a correction coefficient corresponding to a temperature detected by the temperature sensor 25, and multiplies the correction coefficient by a laser output value to correct the laser output of the laser beam to be outputted from the first light source 1 and the second light source 5.

As described above, the laser output of the laser beam to be outputted from the first light source 1 and the second light source 5 is corrected based on the temperature detected by the temperature sensor 25. This enables to suppress a change in light receiving amount of a photodetector 17 with respect to a temperature change.

In this embodiment, a first rise-up mirror 12 reflects a red ray for DVD and an infrared ray for CD toward a first objective lens 14, and a second rise-up mirror 13 reflects a blue ray for BD toward a second objective lens 15. Alternatively, for instance, the first rise-up mirror 12 may reflect a red ray for DVD, an infrared ray for CD, and a blue ray for HD DVD toward the first objective lens 14, and the second rise-up mirror 13 may reflect a blue ray for BD toward the second objective lens 15. Further alternatively, for instance, the first rise-up mirror 12 may reflect a red ray for DVD and an infrared ray for CD toward the first objective lens 14, and the second rise-up mirror 13 may reflect a blue ray for BD and a blue ray for HD DVD toward the second objective lens 15.

The optical pickup device in this embodiment is provided with the first rise-up mirror 12 for reflecting a red ray and an infrared ray toward the first objective lens 14, and the second rise-up mirror 13 for reflecting a blue ray toward the second objective lens 15. Alternatively, the optical pickup device may be provided with a single rise-up mirror for reflecting laser beams of three different wavelengths i.e. a red ray, an infrared ray, and a blue ray toward an objective lens.

Seventh Embodiment

In this section, an optical pickup device in accordance with a seventh embodiment of the invention is described. A polarization angle of a laser beam outputted from a light source may be varied resulting from a temperature change or a like factor, which may cause a detection error in a photodetector.

For instance, the beam splitter 2 in the first embodiment has a characteristic that the transmittance Tp of the P-polarized component in the first laser beam is 87%, the transmittance Ts of the S-polarized component in the first laser beam is 87%, the transmittance Tp of the P-polarized component in the second laser beam is 99%, and the transmittance Ts of the S-polarized component in the second laser beam is from 1 to 3%. In this case, the first laser beam turns into an elliptically polarized laser beam, which may cause a variation in the S-polarized component after its transmittance through the beam splitter 2. Also, since the beam splitter 2 transmits the S-polarized component in the second laser beam as well as the P-polarized component in the second laser beam, the S-polarized component in the second laser beam after its transmittance through the beam splitter 2 may also be varied.

The light receiving amount of the S-polarized component by a photodetector with respect to the output beam is 40% or less in use of a first laser beam for CD, 15% or less in use of a second laser beam for DVD, and 5% or less in use of a third laser beam for BD. Thus, the light receiving amount of the S-polarized component in the first laser beam and the second laser beam by the photodetector is relatively large. As a result, a detection error may occur in the photodetector resulting from a variation in the S-polarized component.

In view of the above, the optical pickup device in accordance with the seventh embodiment includes a polarization beam splitter for separating a P-polarized component from an S-polarized component to suppress a variation in the polarization angle of a laser beam, and suppress a detection error in a photodetector.

Figure 13:
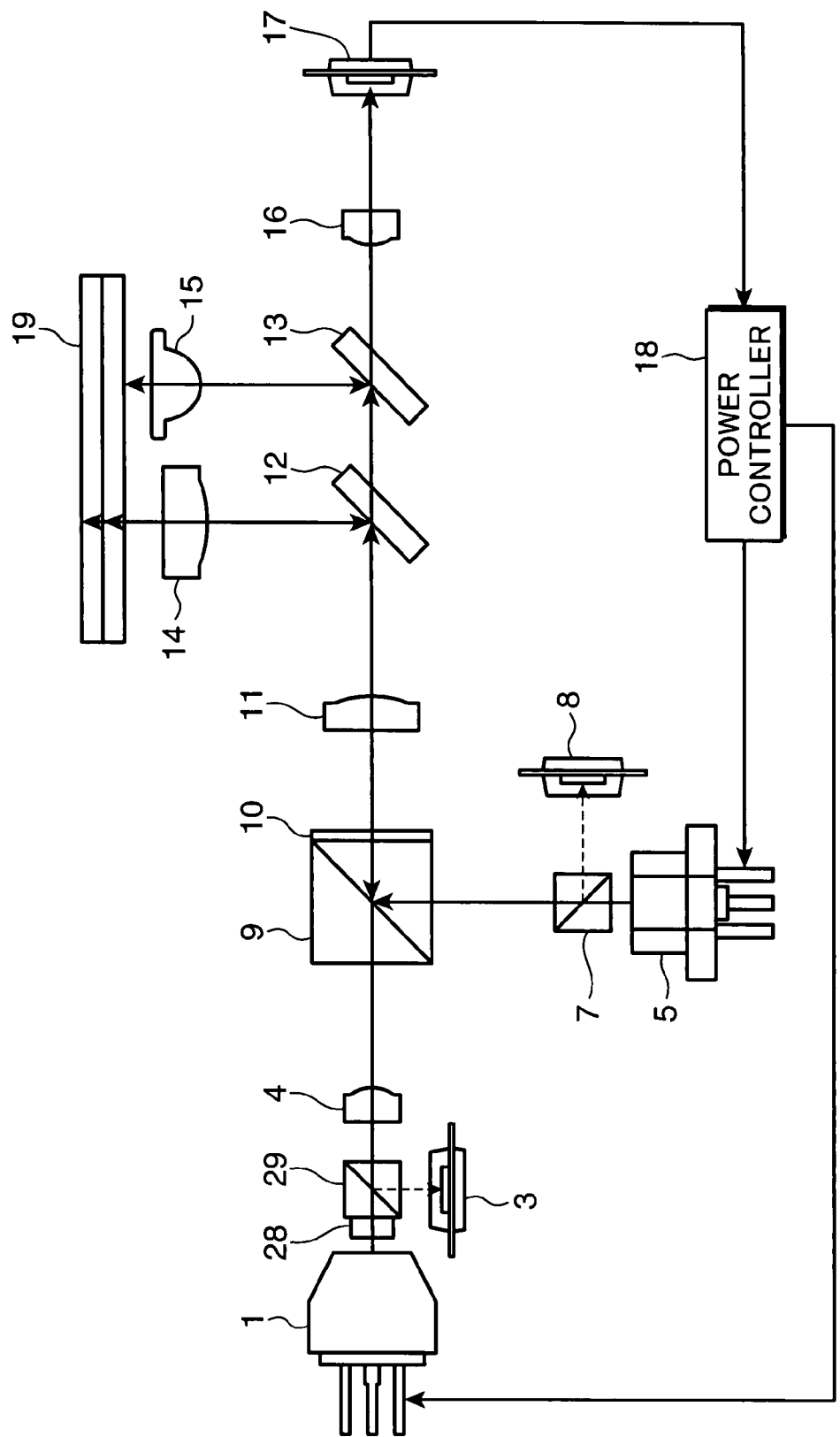
FIG. 13 is a diagram showing an arrangement of an optical pickup device in accordance with a seventh embodiment of the invention.

FIG. 13 is a diagram showing an arrangement of the optical pickup device in accordance with the seventh embodiment. Elements in FIG. 13 identical or substantially equivalent to those of the optical pickup device in the first embodiment are indicated by the same reference numerals, and description thereof is omitted herein, and merely an arrangement different from that in the first embodiment is described.

The optical pickup device in accordance with the seventh embodiment is provided with a polarization stabilizer 28 and a polarization beam splitter 29, in place of the beam splitter 2 in the first embodiment.

The polarization stabilizer 28 transmits an S-polarized component in a first laser beam and a second laser beam outputted from a first light source 1 at a predetermined ratio e.g. one-tenth relative to the total S-polarized component. The polarization stabilizer 28 may be a half wavelength plate.

The polarization beam splitter 29 is disposed between the polarization stabilizer 28 and a beam splitter 9 for transmitting the first laser beam or the second laser beam transmitted through the polarization stabilizer 28, and reflecting the first laser beam or the second laser beam reflected on the optical recording medium 19. Specifically, the polarization beam splitter 29 transmits the P-polarized component in the first laser beam and the second laser beam, and reflects the S-polarized component in the first laser beam and the second laser beam.

The first laser beam or the second laser beam outputted from the first light source 1 is incident onto the polarization stabilizer 28. In this operation, the polarization stabilizer 28 transmits the P-polarized component, and the S-polarized component by the amount of one-tenth of the total S-polarized component in the first laser beam or the second laser beam. The polarization beam splitter 29 transmits merely the P-polarized component in the first laser beam or the second laser beam.

On the other hand, the polarization beam splitter 29 reflects merely the S-polarized component in the first laser beam or the second laser beam reflected on the optical recording medium 19 for incidence onto a first signal detector 3.

In the above operation, the light receiving amount of the S-polarized component in the first laser beam or the second laser beam by a photodetector 17 with respect to the output beam is from 8 to 11% in use of the first laser beam for CD, 8% or more to 11% or more in use of the second laser beam for DVD, and 5% in use of the third laser beam for BD. Thus, the light receiving amount of the S-polarized component in the first laser beam and the second laser beam by the photodetector 17 is decreased, thereby suppressing a detection error in the photodetector 17 resulting from a variation in the S-polarized component.

As described above, the first light source 1 outputs the first laser beam of the first wavelength λ1 and the second laser beam of the second wavelength λ2 shorter than the first wavelength λ1. A second light source 5 outputs the third laser beam of the third wavelength λ3 shorter than the second wavelength λ2. The beam splitter 9 transmits the first laser beam and the second laser beam outputted from the first light source 1 toward a first rise-up mirror 12, and reflects the third laser beam outputted from the second light source 5 toward the first rise-up mirror 12. Then, the polarization stabilizer 28 transmits the S-polarized component in the first laser beam and the second laser beam outputted from the first light source 1 by the predetermined ratio relative to the total S-polarized component. Then, the polarization beam splitter 29 disposed between the polarization stabilizer 28 and the beam splitter 9 transmits the first laser beam or the second laser beam transmitted through the polarization stabilizer 28, and reflects the first laser beam or the second laser beam reflected on the optical recording medium 19. The polarization beam splitter 29 transmits the P-polarized component in the first laser beam and the second laser beam, and reflects the S-polarized component in the first laser beam and the second laser beam.

Thus, the polarization stabilizer 28 transmits the S-polarized component in the first laser beam and the second laser beam by the predetermined ratio relative to the total S-polarized component. The polarization beam splitter 29 transmits merely the P-polarized component in the first laser beam and the second laser beam. Thereby, variation in the S-polarized component can be securely suppressed, and a detection error in the photodetector 17 can be suppressed.

Figure 14:
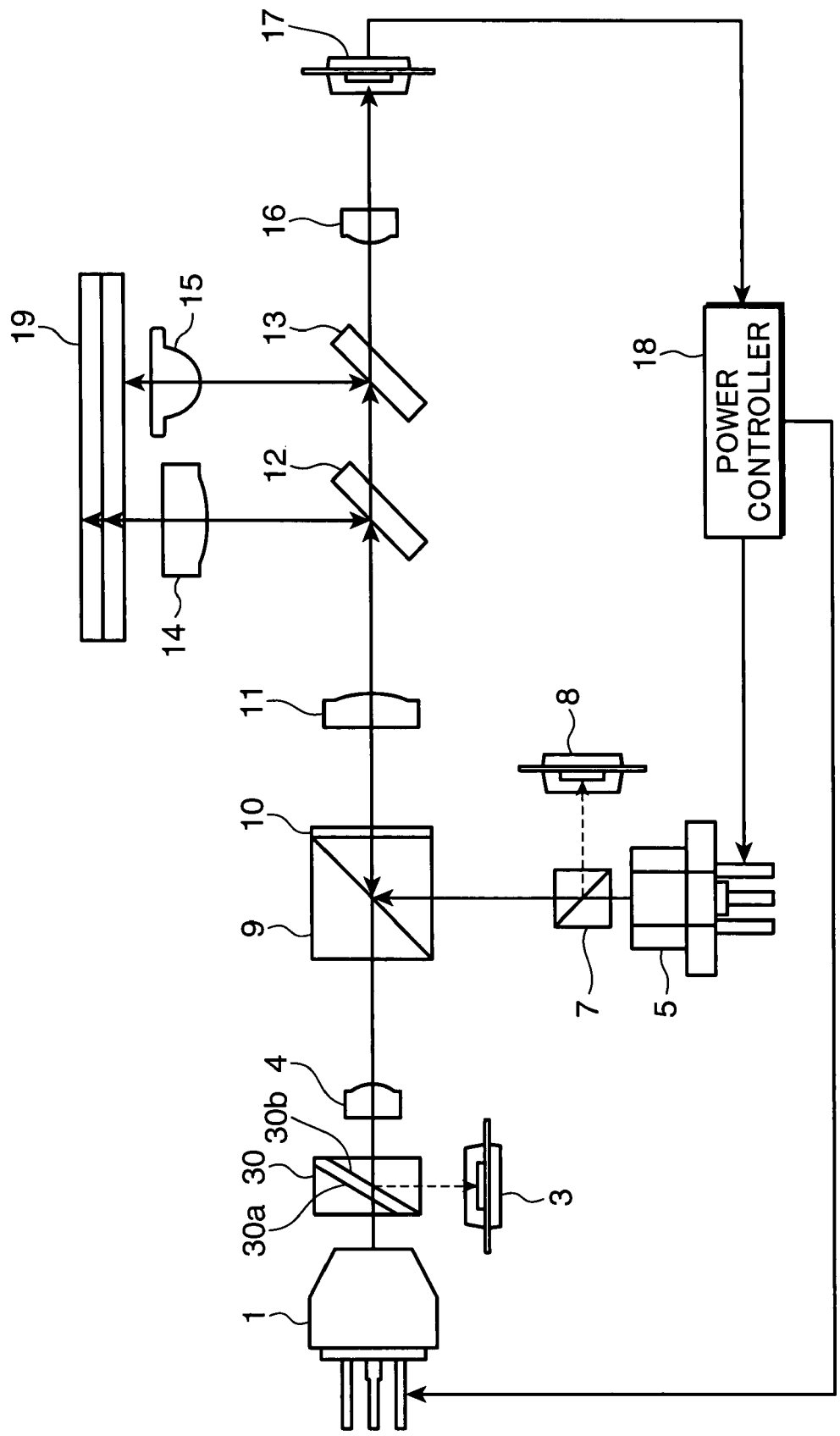
FIG. 14 is a diagram showing an arrangement of an optical pickup device as a modification of the seventh embodiment.

In the following, a modification of the seventh embodiment is described. FIG. 14 is a diagram showing an arrangement of an optical pickup device as the modification of the seventh embodiment. Elements in FIG. 14 identical or substantially equivalent to those of the optical pickup device in the first embodiment are indicated by the same reference numerals, and description thereof is omitted herein, and merely an arrangement different from that in the first embodiment is described.

The optical pickup device as the modification of the seventh embodiment is provided with a polarization beam splitter 30, in place of the beam splitter 2 in the first embodiment.

The polarization beam splitter 30 is disposed between a first light source 1 and a beam splitter 9. The polarization beam splitter 30 transmits a first laser beam or a second laser beam outputted from the first light source 1, and reflects the first laser beam or the second laser beam reflected on the optical recording medium 19. Specifically, the polarization beam splitter 30 includes a first optical film 30a for transmitting a P-polarized component in the first laser beam and the second laser beam, and reflecting an S-polarized component in the first laser beam and the second laser beam; and a second optical film 30b for transmitting the P-polarized component in the first laser beam at a predetermined transmittance Tp e.g. 85% without transmitting the S-polarized component in the first laser beam i.e. at a transmittance Ts=0%, and transmitting the P-polarized component in the second laser beam and reflecting the S-polarized component in the second laser beam.

After the first laser beam or the second laser beam outputted from the first light source 1 is incident onto the first optical film 30a of the polarization beam splitter 30, the first laser beam or the second laser beam is incident onto the second optical film 30b of the polarization beam splitter 30. In this operation, the first optical film 30a transmits merely the P-polarized component in the first laser beam, and the second optical film 30b transmits the P-polarized component in the first laser beam at the predetermined transmittance. Further, the first optical film 30a transmits merely the P-polarized component in the second laser beam, and the second optical film 30b transmits merely the P-polarized component in the second laser beam.

On the other hand, the second optical film 30b reflects the S-polarized component in the first laser beam reflected on the optical recording medium 19 by 100% for incidence onto a first signal detector 3. The second optical film 30b reflects merely the S-polarized component in the second laser beam reflected on the optical recording medium 19 for incidence onto the first signal detector 3.

In the above operation, the light receiving amount of the S-polarized component in the first laser beam and the second laser beam by the photodetector 17 with respect to the output beam is from 8 to 11% in use of the first laser beam for CD, from 8 to 11% in use of the second laser beam for DVD, and 5% in use of the third laser beam for BD. Thus, the light receiving amount of the S-polarized component in the first laser beam and the second laser beam by the photodetector 17 is reduced, thereby suppressing a detection error in the photodetector 17 resulting from a variation in the S-polarized component.

As described above, in the modification, the first light source 1 outputs the first laser beam of the first wavelength λ1 and the second laser beam of the second wavelength λ2 shorter than the first wavelength λ1. A second light source 5 outputs the third laser beam of the third wavelength λ3 shorter than the second wavelength λ2. The beam splitter 9 transmits the first laser beam and the second laser beam outputted from the first light source 1 toward a first rise-up mirror 12, and reflects the third laser beam outputted from the second light source 5 toward the first rise-up mirror 12. The polarization beam splitter 30 disposed between the first light source 1 and the beam splitter 9 transmits the first laser beam or the second laser beam outputted from the first light source 1, and reflects the first laser beam or the second laser beam reflected on the optical recording medium 19. In this operation, the first optical film 30a of the polarization beam splitter 30 transmits the P-polarized component in the first laser beam and the second laser beam, and reflects the S-polarized component in the first laser beam and the second laser beam. The second optical film 30b of the polarization beam splitter 30 transmits the P-polarized component in the first laser beam at the predetermined transmittance without transmitting the S-polarized component in the first laser beam, and transmits the P-polarized component in the second laser beam and reflects the S-polarized component in the second laser beam.

Thus, the first optical film 30a of the polarization beam splitter 30 transmits merely the P-polarized component in the first laser beam and the second laser beam, and the second optical film 30b of the polarization beam splitter 30 transmits merely the P-polarized component in the first laser beam at the predetermined transmittance, and transmits merely the P-polarized component in the second laser beam. This enables to securely suppress a variation in the S-polarized component, and suppress a detection error in the photodetector 17.

The arrangement of the optical pickup device in accordance with the seventh embodiment is not only applicable to the optical pickup device in accordance with the first embodiment shown in FIG. 1, but also applicable to the optical pickup devices in accordance with the modification of the first embodiment shown in FIG. 4, the second embodiment shown in FIG. 5, the modification of the second embodiment shown in FIG. 6, the third embodiment shown in FIG. 7, the fourth embodiment shown in FIG. 8, the fifth embodiment shown in FIG. 9, the modification of the fifth embodiment shown in FIG. 11, and the sixth embodiment shown in FIG. 12.

In this embodiment, the first rise-up mirror 12 reflects a red ray for DVD and an infrared ray for CD toward a first objective lens 14, and a second rise-up mirror 13 reflects a blue ray for BD toward a second objective lens 15. Alternatively, for instance, the first rise-up mirror 12 may reflect a red ray for DVD, an infrared ray for CD, and a blue ray for HD DVD toward the first objective lens 14, and the second rise-up mirror 13 may reflect a blue ray for BD toward the second objective lens 15. Further alternatively, for instance, the first rise-up mirror 12 may reflect a red ray for DVD and an infrared ray for CD toward the first objective lens 14, and the second rise-up mirror 13 may reflect a blue ray for BD and a blue ray for HD DVD toward the second objective lens 15.

The optical pickup device in this embodiment is provided with the first rise-up mirror 12 for reflecting a red ray and an infrared ray toward the first objective lens 14, and the second rise-up mirror 13 for reflecting a blue ray toward the second objective lens 15. Alternatively, the optical pickup device may be provided with a single rise-up mirror for reflecting laser beams of three different wavelengths i.e. a red ray, an infrared ray, and a blue ray toward an objective lens.

Eighth Embodiment

Figure 15:
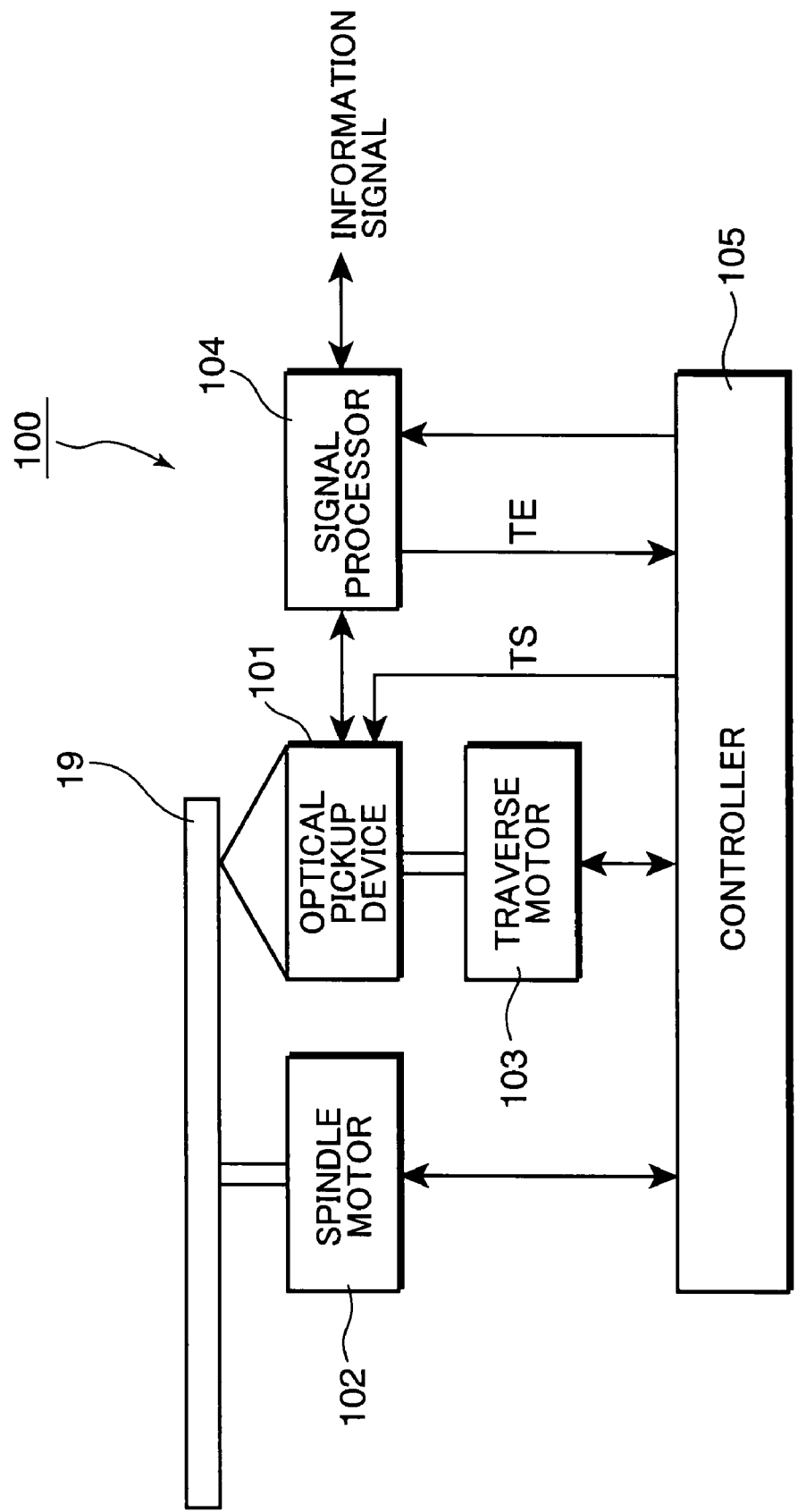
FIG. 15 is a block diagram showing a schematic arrangement of an optical recording medium driving device in accordance with an eighth embodiment of the invention.

FIG. 15 is a block diagram showing a schematic arrangement of an optical recording medium driving device in accordance with an eighth embodiment of the invention. An optical recording medium driving device 100 in accordance with the eighth embodiment includes an optical pickup device 101, a spindle motor 102, a traverse motor 103, a signal processor 104, and a controller 105.

The optical pickup device 101 is any one of the optical pickup devices in accordance with the first through the seventh embodiments. The spindle motor 102 rotates the optical recording medium 19 at a fixed rotation number or a fixed linear velocity based on a rotation control signal supplied from the controller 105. The traverse motor 103 moves the optical pickup device 101 to a radially predetermined position on the optical recording medium 19 based on a movement control signal supplied from the controller 105.

The signal processor 104 modulates an information signal supplied from an external device, transmits the modulated signal to the optical pickup device 101, demodulates the modulated signal in response to an electric signal in accordance with a light intensity of a laser beam detected by the optical pickup device 101, generates a tracking error signal TE of a differential push pull (DPP) method based on the electric signal, and transmits the tracking error signal TE to the controller 105.

The controller 105 controls driving of the spindle motor 102 and the traverse motor 103, generates a tracking servo signal TS based on the tracking error signal TE of the DPP method sent from the signal processor 104, and controls driving of the optical pickup device 101 to perform tracking servo control with respect to the optical recording medium 19.

As described above, the spindle motor 102 rotates the optical recording medium 19. A first signal detector 3 or a second signal detector 8 included in the optical pickup device 101 receives a laser beam reflected on the optical recording medium 19, and converts the received laser beam into an electric signal in accordance with a light intensity of the received laser beam. Then, the traverse motor 103 drives the optical pickup device 101 at least in a radial direction with respect to an information track in the optical recording medium 19. Then, the signal processor 104 generates a tracking error signal based on the electric signal sent from the first signal detector 3 or the second signal detector 8 in the optical pickup device 101. The controller 105 controls driving of the spindle motor 102, and controls driving of the traverse motor 103 to perform tracking servo control with respect to the optical recording medium 19 based on the tracking error signal sent from the signal processor 104.

Thus, the optical recording medium driving device 100 in accordance with the eighth embodiment has operations and/or effects of the optical pickup device in accordance with any one of the first through the seventh embodiment. Thereby, accurate tracking servo control with respect to the optical recording medium 19 can be realized.

The aforementioned embodiments primarily embrace the inventions having the following arrangements.

An optical pickup device according to an aspect of the invention comprises: a light source for outputting a laser beam of a predetermined wavelength; a photodetector for detecting an intensity of the laser beam outputted from the light source to control a power of the laser beam to be outputted from the light source; a polarization beam converter for converting the laser beam outputted from the light source into a circularly polarized laser beam; and a mirror for guiding part of the laser beam converted by the polarization beam converter to the photodetector, and guiding the remainder of the laser beam to an optical recording medium.

In the above arrangement, the laser beam of the predetermined wavelength is outputted from the light source, and the laser beam outputted from the light source is converted into a circularly polarized laser beam. Then, part of the circularly polarized laser beam is guided to the photodetector, and the remainder thereof is guided to the optical recording medium.

In the above arrangement, the laser beam outputted from the light source is converted into a circularly polarized laser beam, and the circularly polarized laser beam is splittingly guided to the photodetector and the optical recording medium. Accordingly, the incident light component in the polarizing direction to be guided to the photodetector is halved. Thus, the amount of light to be guided to the photodetector can be halved without lowering the reflectance or the transmittance of the mirror in the polarizing direction. This enables to increase the amount of light to be guided to the optical recording medium, while suppressing a variation in light detection amount by the photodetector, thereby enabling to accurately control the power of the light source.

Preferably, in the optical pickup device, the mirror may include a partly transmitting mirror for transmitting the laser beam that has been converted into a circularly polarized laser beam by the polarization beam converter toward the photodetector, and reflecting the laser beam toward the optical recording medium, and the partly transmitting mirror may have a characteristic that a transmittance of a P-polarized component in the laser beam is larger than a transmittance of an S-polarized component in the laser beam.

In the above arrangement, the partly transmitting mirror transmits the circularly polarized laser beam toward the photodetector, and reflects the circularly polarized laser beam toward the optical recording medium. The partly transmitting mirror has a characteristic that the transmittance of the P-polarized component is larger than the transmittance of the S-polarized component. This enables to transmit a larger amount of the P-polarized laser beam than the S-polarized laser beam to thereby guide the P-polarized laser beam toward the photodetector.

Preferably, in the optical pickup device, the mirror may include a partly reflecting mirror for reflecting the laser beam that has been converted into a circularly polarized laser beam by the polarization beam converter toward the photodetector, and transmitting the laser beam toward the optical recording medium, and the partly reflecting mirror may have a characteristic that a reflectance of an S-polarized component in the laser beam is larger than a reflectance of a P-polarized component in the laser beam.

In the above arrangement, the partly reflecting mirror reflects the circularly polarized laser beam converted by the polarization beam converter toward the photodetector, and transmits the laser beam toward the optical recording medium. The partly reflecting mirror has the characteristic that the reflectance of the S-polarized component in the laser beam is larger than the reflectance of the P-polarized component in the laser beam. This enables to reflect a larger amount of the S-polarized laser beam than the P-polarized laser beam to thereby guide the S-polarized laser beam toward the photodetector.

Preferably, in the optical pickup device, the light source may output a first laser beam of a first wavelength, a second laser beam of a second wavelength shorter than the first wavelength, and a third laser beam of a third wavelength shorter than the second wavelength, the polarization beam converter may convert the first laser beam into a first circularly polarized laser beam, convert the second laser beam into a second circularly polarized laser beam, and convert the third laser beam into a third circularly polarized laser beam, and the mirror may include: a first mirror for transmitting part of the first laser beam, part of the second laser beam, and all of the third laser beam that have been converted into a circularly polarized laser beam by the polarization beam converter, and reflecting the remainder of the first laser beam and the remainder of the second laser beam toward the optical recording medium, and a second mirror for transmitting all of the first laser beam, all of the second laser beam, and part of the third laser beam that have been transmitted through the first mirror toward the photodetector, and reflecting the remainder of the third laser beam toward the optical recording medium.

In the above arrangement, the light source outputs the first laser beam of the first wavelength, the second laser beam of the second wavelength shorter than the first wavelength, and the third laser beam of the third wavelength shorter than the second wavelength. The polarization beam converter converts the first laser beam into the first circularly polarized laser beam, converts the second laser beam into the second circularly polarized laser beam, and converts the third laser beam into the third circularly polarized laser beam. The first mirror transmits part of the first laser beam, part of the second laser beam, and all of the third laser beam that have been converted into a circularly polarized laser beam, and reflects the remainder of the first laser beam and the remainder of the second laser beam toward the optical recording medium. The second mirror transmits all of the first laser beam, all of the second laser beam, and part of the third laser beam that have been transmitted through the first mirror toward the photodetector, and reflects the remainder of the third laser beam toward the optical recording medium.

Accordingly, the first mirror is operative to guide the first laser beam of the first wavelength, and the second laser beam of the second wavelength shorter than the first wavelength to the optical recording medium, and the second mirror is operative to guide the third laser beam of the third wavelength shorter than the second wavelength to the optical recording medium, while guiding the first laser beam, the second laser beam, and the third laser beam to the photodetector.

Preferably, in the optical pickup device, the first mirror may include a partly transmitting mirror having a characteristic that a transmittance of a P-polarized component and a transmittance of an S-polarized component in the first laser beam and the second laser beam are respectively a predetermined value and substantially 0, and a transmittance of a P-polarized component and a transmittance of an S-polarized component in the third laser beam are both substantially 1, and the second mirror may include a partly transmitting mirror having a characteristic that the transmittance of the P-polarized component and the transmittance of the S-polarized component in the first laser beam and the second laser beam are respectively a predetermined value and substantially 0, and the transmittance of the P-polarized component and the transmittance of the S-polarized component in the third laser beam are respectively a predetermined value and substantially 0.

In the above arrangement, the first mirror transmits part of the S-polarized component in the first laser beam and the second laser beam, reflects all of the S-polarized component in the first laser beam and the second laser beam toward the optical recording medium, and transmits all of the P-polarized component and all of the S-polarized component in the third laser beam. The second mirror transmits part of the P-polarized component in the first laser beam and the second laser beam, transmits part of the P-polarized component in the third laser beam, and reflects all of the S-polarized component in the third laser beam toward the optical recording medium.

Accordingly, the first mirror is operative to guide the first laser beam and the second laser beam to the optical recording medium, and the second mirror is operative to guide the third laser beam to the optical recording medium, while guiding the first laser beam, the second laser beam, and the third laser beam to the photodetector.

Preferably, in the optical pickup device, the light source may output a first laser beam of a first wavelength, a second laser beam of a second wavelength shorter than the first wavelength, and a third laser beam of a third wavelength shorter than the second wavelength, the polarization beam converter may convert the first laser beam into a first circularly polarized laser beam, convert the second laser beam into a second circularly polarized laser beam, and convert the third laser beam into a third circularly polarized laser beam, and the mirror may include: a first mirror for reflecting part of the first laser beam and part of the second laser beam that have been converted into a circularly polarized laser beam by the polarization beam converter toward the photodetector, and transmitting the remainder of the first laser beam and the remainder of the second laser beam, and all of the third laser beam that has been converted into a circularly polarized laser beam by the polarization beam converter, and a second mirror for reflecting part of the third laser beam transmitted through the first mirror toward the photodetector, and transmitting all of the first laser beam and all of the second laser beam that have been transmitted through the first mirror, and the remainder of the third laser beam toward the optical recording medium.

In the above arrangement, the light source outputs the first laser beam of the first wavelength, the second laser beam of the second wavelength shorter than the first wavelength, and the third laser beam of the third wavelength shorter than the second wavelength. The polarization beam converter converts the first laser beam into the first circularly polarized laser beam, converts the second laser beam into the second circularly polarized laser beam, and converts the third laser beam into the third circularly polarized laser beam. The first mirror reflects part of the first laser beam and part of the second laser beam that have been converted into a circularly polarized laser beam toward the photodetector, and transmits the remainder of the first laser beam and the remainder of the second laser beam, and all of the third laser beam that has been converted into a circularly polarized laser beam. The second mirror reflects part of the third laser beam transmitted through the first mirror toward the photodetector, and transmits all of the first laser beam and all of the second laser beam that have been transmitted through the first mirror, and the remainder of the third laser beam toward the optical recording medium.

Accordingly, the first mirror is operative to guide the first laser beam of the first wavelength, and the second laser beam of the second wavelength shorter than the first wavelength to the photodetector, and the second mirror is operative to guide the third laser beam of the third wavelength shorter than the second wavelength to the photodetector, while guiding the first laser beam, the second laser beam, and the third laser beam to the optical recording medium.

Preferably, in the optical pickup device, the first mirror may include a partly reflecting mirror having a characteristic that a reflectance of a P-polarized component and a reflectance of an S-polarized component in the first laser beam and the second laser beam are respectively substantially 0 and a predetermined value, and a reflectance of a P-polarized component and a reflectance of an S-polarized component in the third laser beam are both substantially 0, and the second mirror may include a partly reflecting mirror having a characteristic that the reflectance of the P-polarized component and the reflectance of the S-polarized component in the first laser beam and the second laser beam are respectively substantially 0 and a predetermined value, and the reflectance of the P-polarized component and the reflectance of the S-polarized component in the third laser beam are respectively substantially 0 and a predetermined value.

In the above arrangement, the first mirror transmits part of the P-polarized component in the first laser beam and the second laser beam, reflects all of the S-polarized component in the first laser beam and the second laser beam toward the optical recording medium, and transmits all of the P-polarized component and all of the S-polarized component in the third laser beam. The second mirror transmits part of the P-polarized component in the first laser beam and the second laser beam, transmits part of the P-polarized component in the third laser beam, and reflects all of the S-polarized component in the third laser beam toward the optical recording medium.

Accordingly, the first mirror is operative to guide the first laser beam of the first wavelength, and the second laser beam of the second wavelength shorter than the first wavelength to the photodetector, and the second mirror is operative to guide the third laser beam of the third wavelength shorter than the second wavelength to the photodetector, while guiding the first laser beam, the second laser beam, and the third laser beam to the optical recording medium.

Preferably, in the optical pickup device, the light source may output a first laser beam of a first wavelength, a second laser beam of a second wavelength shorter than the first wavelength, and a third laser beam of a third wavelength shorter than the second wavelength, the polarization beam converter may convert the first laser beam into a first circularly polarized laser beam, convert the second laser beam into a second circularly polarized laser beam, and convert the third laser beam into a third circularly polarized laser beam, and the mirror may include: a first mirror for transmitting all of the first laser beam, all of the second laser beam, and part of the third laser beam that have been converted into a circularly polarized laser beam by the polarization beam converter, and reflecting the remainder of the third laser beam toward the optical recording medium, and a second mirror for transmitting part of the first laser beam, part of the second laser beam, and all of the third laser beam that have been transmitted through the first mirror, and reflecting the remainder of the first laser beam and the remainder of the second laser beam toward the optical recording medium.

In the above arrangement, the light source outputs the first laser beam of the first wavelength, the second laser beam of the second wavelength shorter than the first wavelength, and the third laser beam of the third wavelength shorter than the second wavelength. The polarization beam converter converts the first laser beam into the first circularly polarized laser beam, converts the second laser beam into the second circularly polarized laser beam, and converts the third laser beam into the third circularly polarized laser beam. The first mirror transmits all of the first laser beam, all of the second laser beam, and part of the third laser beam that have been converted into a circularly polarized laser beam, and reflects the remainder of the third laser beam toward the optical recording medium. The second mirror transmits part of the first laser beam, part of the second laser beam, and all of the third laser beam that have been transmitted through the first mirror, and reflects the remainder of the first laser beam and the remainder of the second laser beam toward the optical recording medium.

Accordingly, the first mirror is operative to guide the third laser beam of the third wavelength shorter than the second wavelength to the optical recording medium, and the second mirror is operative to guide the first laser beam of the first wavelength, and the second laser beam of the second wavelength shorter than the first wavelength to the optical recording medium, while guiding the first laser beam, the second laser beam, and the third laser beam to the photodetector.

Preferably, in the optical pickup device, the first mirror may include a partly transmitting mirror having a characteristic that a transmittance of a P-polarized component and a transmittance of an S-polarized component in the first laser beam and the second laser beam are both substantially 1, and a transmittance of a P-polarized component and a transmittance of an S-polarized component in the third laser beam are respectively a predetermined value and substantially 0, and the second mirror may include a partly transmitting mirror having a characteristic that the transmittance of the P-polarized component and the transmittance of the S-polarized component in the first laser beam and the second laser beam are respectively a predetermined value and substantially 0, and the transmittance of the P-polarized component and the transmittance of the S-polarized component in the third laser beam are respectively a predetermined value and substantially 0.

In the above arrangement, the first mirror transmits all of the P-polarized component and all of the S-polarized component in the first laser beam and the second laser beam, transmits part of the P-polarized component in the third laser beam, and reflects all of the S-polarized component in the third laser beam toward the optical recording medium. The second mirror transmits part of the P-polarized component in the first laser beam and the second laser beam, transmits part of the P-polarized component in the third laser beam, and reflects all of the S-polarized component in the third laser beam toward the optical recording medium.

Accordingly, the first mirror is operative to guide the third laser beam to the optical recording medium, and the second mirror is operative to guide the first laser beam and the second laser beam to the optical recording medium, while guiding the first laser beam, the second laser beam, and the third laser beam to the photodetector.

Preferably, in the optical pickup device, the light source may output a first laser beam of a first wavelength, a second laser beam of a second wavelength shorter than the first wavelength, and a third laser beam of a third wavelength shorter than the second wavelength, the polarization beam converter may convert the first laser beam into a first circularly polarized laser beam, convert the second laser beam into a second circularly polarized laser beam, and convert the third laser beam into a third circularly polarized laser beam, and the mirror may include: a first mirror for reflecting part of the third laser beam that has been converted into a circularly polarized laser beam by the polarization beam converter toward the photodetector, and transmitting all of the first laser beam and all of the second laser beam that have been converted into a circularly polarized laser beam by the polarization beam converter, and the remainder of the third laser beam, and a second mirror for reflecting part of the first laser beam and part of the second laser beam that have been transmitted through the first mirror toward the photodetector, and transmitting the remainder of the first laser beam and the remainder of the second laser beam, and all of the third laser beam that has been transmitted through the first mirror toward the optical recording medium.

In the above arrangement, the light source outputs the first laser beam of the first wavelength, the second laser beam of the second wavelength shorter than the first wavelength, and the third laser beam of the third wavelength shorter than the second wavelength. The polarization beam converter converts the first laser beam into the first circularly polarized laser beam, converts the second laser beam into the second circularly polarized laser beam, and converts the third laser beam into the third circularly polarized laser beam. The first mirror reflects part of the third laser beam that has been converted into a circularly polarized laser beam toward the photodetector, and transmits all of the first laser beam and all of the second laser beam that have been converted into a circularly polarized laser beam, and the remainder of the third laser beam therethrough. The second mirror reflects part of the first laser beam and part of the second laser beam that have been transmitted through the first mirror toward the photodetector, and transmits the remainder of the first laser beam and the remainder of the second laser beam, and all of the third laser beam that has been transmitted through the first mirror toward the optical recording medium.

Accordingly, the first mirror is operative to guide the third laser beam of the third wavelength shorter than the second wavelength to the photodetector, and the second mirror is operative to guide the first laser beam of the first wavelength, and the second laser beam of the second wavelength shorter than the first wavelength to the photodetector, while guiding the first laser beam, the second laser beam, and the third laser beam to the optical recording medium.

Preferably, in the optical pickup device, the first mirror may include a partly reflecting mirror having a characteristic that a reflectance of a P-polarized component and a reflectance of an S-polarized component in the first laser beam and the second laser beam are both substantially 0, and a reflectance of a P-polarized component and a reflectance of an S-polarized component in the third laser beam are respectively substantially 0 and a predetermined value, and the second mirror may include a partly reflecting mirror having a characteristic that the reflectance of the P-polarized component and the reflectance of the S-polarized component in the first laser beam and the second laser beam are respectively substantially 0 and a predetermined value, and the reflectance of the P-polarized component and the reflectance of the S-polarized component in the third laser beam are respectively substantially 0 and a predetermined value.

In the above arrangement, the first mirror transmits all of the P-polarized component and all of the S-polarized component in the first laser beam and the second laser beam, transmits all of the P-polarized component in the third laser beam, and reflects part of the S-polarized component toward the photodetector. The second mirror transmits all of the P-polarized component in the first laser beam and the second laser beam toward the optical recording medium, reflects part of the S-polarized component toward the photodetector, and transmits all of the P-polarized component in the third laser beam toward the optical recording medium.

Accordingly, the first mirror is operative to guide the third laser beam to the photodetector, and the second mirror is operative to guide the first laser beam and the second laser beam to the photodetector, while guiding the first laser beam, the second laser beam, and the third laser beam to the optical recording medium.

Preferably, the optical pickup device may further comprise: a beam splitter for transmitting the first laser beam and the second laser beam outputted from the light source toward the first mirror, and reflecting the third laser beam outputted from the light source toward the first mirror, wherein the polarization beam converter is disposed between the beam splitter and the first mirror.

In the above arrangement, the beam splitter transmits the first laser beam and the second laser beam outputted from the light source toward the first mirror, and reflects the third laser beam outputted from the light source toward the first mirror. The polarization beam converter is disposed between the beam splitter and the first mirror. Accordingly, the laser beam can be converted into a circularly polarized laser beam before its incidence onto the first mirror.

Preferably, in the optical pickup device, the photodetector may have a light receiving surface for receiving the laser beam, the light receiving surface being aligned in parallel with a recording surface of the optical recording medium, and the optical pickup device may further include a reflection mirror for reflecting the laser beam guided by the mirror toward the photodetector.

In the above arrangement, the light receiving surface of the photodetector for receiving the laser beam is aligned in parallel with the recording surface of the optical recording medium, and the laser beam guided by the mirror is reflected toward the photodetector. Accordingly, the light receiving surface of the photodetector is aligned in parallel with the recording surface of the optical recording medium, unlike an arrangement that the light receiving surface of the photodetector is oriented in a direction perpendicularly intersecting with the optical axis of the laser beam to be guided by the mirror. This arrangement enables to reduce the thickness of the optical pickup device.

Preferably, in the optical pickup device, the light source may include a first light source for outputting a first laser beam of a first wavelength and a second laser beam of a second wavelength shorter than the first wavelength, and a second light source for outputting a third laser beam of a third wavelength shorter than the second wavelength, and the optical pickup device may further include: a beam splitter for transmitting the first laser beam and the second laser beam outputted from the first light source toward the first mirror, and reflecting the third laser beam outputted from the second light source toward the first mirror; a polarization stabilizer for transmitting an S-polarized component in the first laser beam and the second laser beam outputted from the first light source at a predetermined ratio relative to the total S-polarized component in the first laser beam and the second laser beam; and a polarization beam splitter, disposed between the polarization stabilizer and the beam splitter, for transmitting the first laser beam or the second laser beam transmitted through the polarization stabilizer, and reflecting the first laser beam or the second laser beam reflected on the optical recording medium, wherein the polarization beam splitter transmits a P-polarized component in the first laser beam and the second laser beam, and reflects the S-polarized component in the first laser beam and the second laser beam.

In the above arrangement, the first light source outputs the first laser beam of the first wavelength, and the second laser beam of the second wavelength shorter than the first wavelength. The second light source outputs the third laser beam of the third wavelength shorter than the second wavelength. The beam splitter transmits the first laser beam and the second laser beam outputted from the first light source toward the first mirror, and reflects the third laser beam outputted from the second light source toward the first mirror. The polarization stabilizer transmits the S-polarized component in the first laser beam and the second laser beam outputted from the first light source at the predetermined ratio relative to the total S-polarized component in the first laser beam and the second laser beam. The polarization beam splitter, disposed between the polarization stabilizer and the beam splitter, transmits the first laser beam or the second laser beam transmitted through the polarization stabilizer, and reflects the first laser beam or the second laser beam reflected on the optical recording medium. The polarization beam splitter transmits the P-polarized component in the first laser beam and the second laser beam, and reflects the S-polarized component in the first laser beam and the second laser beam.

Accordingly, the polarization stabilizer for removing a predetermined polarization component transmits the S-polarized component in the first laser beam and the second laser beam at the predetermined ratio, and the polarization beam splitter transmits merely the P-polarized component in the first laser beam and the second laser beam. This enables to securely suppress a variation in the S-polarized component, and suppress a detection error in the photodetector.

Preferably, in the optical pickup device, the light source may include a first light source for outputting a first laser beam of a first wavelength and a second laser beam of a second wavelength shorter than the first wavelength, and a second light source for outputting a third laser beam of a third wavelength shorter than the second wavelength, and the optical pickup device may further include: a beam splitter for transmitting the first laser beam and the second laser beam outputted from the first light source toward the first mirror, and reflecting the third laser beam outputted from the second light source toward the first mirror; and a polarization beam splitter, disposed between the first light source and the beam splitter, for transmitting the first laser beam or the second laser beam outputted from the first light source, and reflecting the first laser beam or the second laser beam reflected on the optical recording medium, wherein the polarization beam splitter includes a first optical film for transmitting a P-polarized component in the first laser beam and the second laser beam, and reflecting an S-polarized component in the first laser beam and the second laser beam, and a second optical film for transmitting the P-polarized component in the first laser beam at a predetermined transmittance without transmitting the S-polarized component in the first laser beam, and transmitting the P-polarized component in the second laser beam and reflecting the S-polarized component in the second laser beam.

In the above arrangement, the first light source outputs the first laser beam of the first wavelength, and the second laser beam of the second wavelength shorter than the first wavelength. The second light source outputs the third laser beam of the third wavelength shorter than the second wavelength. The beam splitter transmits the first laser beam and the second laser beam outputted from the first light source toward the first mirror, and reflects the third laser beam outputted from the second light source toward the first mirror. The polarization beam splitter, disposed between the first light source and the beam splitter, transmits the first laser beam or the second laser beam outputted from the first light source, and reflects the first laser beam or the second laser beam reflected on the optical recording medium. In this operation, the first optical film of the polarization beam splitter transmits the P-polarized component in the first laser beam and the second laser beam, and reflects the S-polarized component in the first laser beam and the second laser beam. The second optical film of the polarization beam splitter transmits the P-polarized component in the first laser beam at the predetermined transmittance without transmitting the S-polarized component in the first laser beam, and transmits the P-polarized component in the second laser beam and reflects the S-polarized component in the second laser beam.

Accordingly, the first optical film of the polarization beam splitter transmits merely the P-polarized component in the first laser beam and the second laser beam, and the second optical film of the polarization beam splitter transmits merely the P-polarized component in the first laser beam at the predetermined transmittance, and transmits merely the S-polarized component in the second laser beam. This enables to securely suppress a variation in the S-polarized component, and suppress a detection error in the photodetector.

An optical recording medium driving device according to another aspect of the invention is an optical recording medium driving device for recording and/or reproducing information to and/or from an optical recording medium. The optical recording medium driving device comprises a spindle motor for rotating the optical recording medium, and the aforementioned optical pickup device. The optical pickup device includes: a signal detector for receiving the laser beam reflected on the optical recording medium and converting the received laser beam into an electric signal in accordance with a light intensity of the received laser beam; an actuator for driving the optical pickup device at least in a radial direction with respect to an information track in the optical recording medium; a signal processor for generating a tracking error signal based on the electric signal sent from the signal detector of the optical pickup device; and a controller for controlling driving of the spindle motor, and controlling driving of the actuator to perform tracking servo control with respect to the optical recording medium based on the tracking error signal sent from the signal processor.

In the above arrangement, the spindle motor rotates the optical recording medium. The signal detector in the optical pickup device receives the laser beam reflected on the optical recording medium and converts the received laser beam into the electric signal in accordance with the light intensity of the received laser beam. The actuator drives the optical pickup device at least in the radial direction with respect to the information track in the optical recording medium. The signal processor generates the tracking error signal based on the electric signal sent from the signal detector in the optical pickup device. The controller controls driving of the spindle motor, and controls driving of the actuator to perform tracking servo control with respect to the optical recording medium based on the tracking error signal sent from the signal processor.

Accordingly, the optical recording medium driving device has the operations of any one of the aforementioned optical pickup devices, thereby enabling to accurately perform tracking servo control with respect to an optical recording medium.

The inventive optical pickup device and the inventive optical recording medium driving device are capable of accurately controlling the power of the light source, and accordingly useful as an optical pickup device for recording and/or reproducing information to and/or from an optical recording medium, an optical recording medium driving device, or an equivalent device.

This application is based on Japanese Patent Application No. 2006-355347 filed on Dec. 28, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical pickup device comprising:
a light source for outputting a laser beam of a predetermined wavelength;
a photodetector for detecting an intensity of the laser beam outputted from the light source to control a power of the laser beam to be outputted from the light source;
a polarization beam converter for converting the laser beam outputted from the light source into a circularly polarized laser beam; and
a mirror for guiding part of the laser beam converted by the polarization beam converter to the photodetector, and guiding the remainder of the laser beam to an optical recording medium;
wherein
the mirror includes a partly transmitting mirror for transmitting the laser beam that has been converted into a circularly polarized laser beam by the polarization beam converter toward the photodetector, and reflecting the laser beam toward the optical recording medium, and
the partly transmitting mirror has a characteristic that a transmittance of a P-polarized component in the laser beam is larger than a transmittance of an S-polarized component in the laser beam.

2. An optical pickup device comprising:
a light source for outputting a laser beam of a predetermined wavelength;
a photodetector for detecting an intensity of the laser beam outputted from the light source to control a power of the laser beam to be outputted from the light source;
a polarization beam converter for converting the laser beam outputted from the light source into a circularly polarized laser beam; and
a mirror for guiding part of the laser beam converted by the polarization beam converter to the photodetector, and guiding the remainder of the laser beam to an optical recording medium;
wherein
the mirror includes a partly reflecting mirror for reflecting the laser beam that has been converted into a circularly polarized laser beam by the polarization beam converter toward the photodetector, and transmitting the laser beam toward the optical recording medium, and
the partly reflecting mirror has a characteristic that a reflectance of an S-polarized component in the laser beam is larger than a reflectance of a P-polarized component in the laser beam.

3. The optical pickup device according to claim 1, wherein the light source outputs a first laser beam of a first wavelength, a second laser beam of a second wavelength shorter than the first wavelength, and a third laser beam of a third wavelength shorter than the second wavelength,
the polarization beam converter converts the first laser beam into a first circularly polarized laser beam, converts the second laser beam into a second circularly polarized laser beam, and converts the third laser beam into a third circularly polarized laser beam, and the mirror includes:
- a first mirror for transmitting part of the first laser beam, part of the second laser beam, and all of the third laser beam that have been converted into a circularly polarized beam by the polarization beam converter, and reflecting the remainder of the first laser beam and the remainder of the second laser beam toward the optical recording medium, and
- a second mirror for transmitting all of the first laser beam, all of the second laser beam, and part of the third laser beam that have been transmitted through the first mirror toward the photodetector, and reflecting the remainder of the third laser beam toward the optical recording medium.

4. The optical pickup device according to claim 3, wherein the first mirror includes a partly transmitting mirror having a characteristic that a transmittance of a P-polarized component and a transmittance of an S-polarized component in the first laser beam and the second laser beam are respectively a predetermined value and substantially 0, and a transmittance of a P-polarized component and a transmittance of an S-polarized component in the third laser beam are both substantially 1, and the second mirror includes a partly transmitting mirror having a characteristic that the transmittance of the P-polarized component and the transmittance of the S-polarized component in the first laser beam and the second laser beam are respectively a predetermined value and substantially 0, and the transmittance of the P-polarized component and the transmittance of the S-polarized component in the third laser beam are respectively a predetermined value and substantially 0.

5. The optical pickup device according to claim 2, wherein the light source outputs a first laser beam of a first wavelength, a second laser beam of a second wavelength shorter than the first wavelength, and a third laser beam of a third wavelength shorter than the second wavelength, the polarization beam converter converts the first laser beam into a first circularly polarized laser beam, converts the second laser beam into a second circularly polarized laser beam, and converts the third laser beam into a third circularly polarized laser beam, and the mirror includes:
- a first mirror for reflecting part of the first laser beam and part of the second laser beam that have been converted into a circularly polarized laser beam by the polarization beam converter toward the photodetector, and transmitting the remainder of the first laser beam and the remainder of the second laser beam, and all of the third laser beam that has been converted into a circularly polarized laser beam by the polarization beam converter, and
- a second mirror for reflecting part of the third laser beam transmitted through the first mirror toward the photodetector, and transmitting all of the first laser beam and all of the second laser beam that have been transmitted through the first mirror, and the remainder of the third laser beam toward the optical recording medium.

6. The optical pickup device according to claim 5, wherein the first mirror includes a partly reflecting mirror having a characteristic that a reflectance of a P-polarized component and a reflectance of an S-polarized component in the first laser beam and the second laser beam are respectively substantially 0 and a predetermined value, and a reflectance of a P-polarized component and a reflectance of an S-polarized component in the third laser beam are both substantially 0, and the second mirror includes a partly reflecting mirror having a characteristic that the reflectance of the P-polarized component and the reflectance of the S-polarized component in the first laser beam and the second laser beam are respectively substantially 0 and a predetermined value, and the reflectance of the P-polarized component and the reflectance of the S-polarized component in the third laser beam are respectively substantially 0 and a predetermined value.

7. The optical pickup device according to claim 1, wherein the light source outputs a first laser beam of a first wavelength, a second laser beam of a second wavelength shorter than the first wavelength, and a third laser beam of a third wavelength shorter than the second wavelength, the polarization beam converter converts the first laser beam into a first circularly polarized laser beam, converts the second laser beam into a second circularly polarized laser beam, and converts the third laser beam into a third circularly polarized laser beam, and the mirror includes:
- a first mirror for transmitting all of the first laser beam, all of the second laser beam, and part of the third laser beam that have been converted into a circularly polarized laser beam by the polarization beam converter, and reflecting the remainder of the third laser beam toward the optical recording medium, and
- a second mirror for transmitting part of the first laser beam, part of the second laser beam, and all of the third laser beam that have been transmitted through the first mirror, and reflecting the remainder of the first laser beam and the remainder of the second laser beam toward the optical recording medium.

8. The optical pickup device according to claim 7, wherein the first mirror includes a partly transmitting mirror having a characteristic that a transmittance of a P-polarized component and a transmittance of an S-polarized component in the first laser beam and the second laser beam are both substantially 1, and a transmittance of a P-polarized component and a transmittance of an S-polarized component in the third laser beam are respectively a predetermined value and substantially 0, and the second mirror includes a partly transmitting mirror having a characteristic that the transmittance of the P-polarized component and the transmittance of the S-polarized component in the first laser beam and the second laser beam are respectively a predetermined value and substantially 0, and the transmittance of the P-polarized component and the transmittance of the S-polarized component in the third laser beam are respectively a predetermined value and substantially 0.

9. The optical pickup device according to claim 2, wherein the light source outputs a first laser beam of a first wavelength, a second laser beam of a second wavelength shorter than the first wavelength, and a third laser beam of a third wavelength shorter than the second wavelength, the polarization beam converter converts the first laser beam into a first circularly polarized laser beam, converts the second laser beam into a second circularly polarized laser beam, and converts the third laser beam into a third circularly polarized laser beam, and the mirror includes:
- a first mirror for reflecting part of the third laser beam that has been converted into a circularly polarized laser beam by the polarization beam converter toward the photodetector, and transmitting all of the first laser beam and all of the second laser beam that have been converted into a circularly polarized laser beam by the polarization beam converter, and the remainder of the third laser beam, and
- a second mirror for reflecting part of the first laser beam and part of the second laser beam that have been transmitted through the first mirror toward the photodetector, and transmitting the remainder of the first laser beam and the remainder of the second laser beam, and all of the third laser beam that has been transmitted through the first mirror toward the optical recording medium.

10. The optical pickup device according to claim 9, wherein
the first mirror includes a partly reflecting mirror having a characteristic that a reflectance of a P-polarized component and a reflectance of an S-polarized component in the first laser beam and the second laser beam are both substantially 0, and a reflectance of a P-polarized component and a reflectance of an S-polarized component in the third laser beam are respectively substantially 0 and a predetermined value, and
the second mirror includes a partly reflecting mirror having a characteristic that the reflectance of the P-polarized component and the reflectance of the S-polarized component in the first laser beam and the second laser beam are respectively substantially 0 and a predetermined value, and the reflectance of the P-polarized component and the reflectance of the S-polarized component in the third laser beam are respectively substantially 0 and a predetermined value.

11. The optical pickup device according to claim 3, further comprising:
a beam splitter for transmitting the first laser beam and the second laser beam outputted from the light source toward the first mirror, and reflecting the third laser beam outputted from the light source toward the first mirror, wherein
the polarization beam converter is disposed between the beam splitter and the first mirror.

12. The optical pickup device according to claim 3, wherein
the photodetector has a light receiving surface for receiving the laser beam, the light receiving surface being aligned in parallel with a recording surface of the optical recording medium, and
the optical pickup device further includes a reflection mirror for reflecting the laser beam guided by the mirror toward the photodetector.

13. The optical pickup device according to claim 3, wherein
the light source includes a first light source for outputting a first laser beam of a first wavelength and a second laser beam of a second wavelength shorter than the first wavelength, and a second light source for outputting a third laser beam of a third wavelength shorter than the second wavelength, and
the optical pickup device further includes:
a beam splitter for transmitting the first laser beam and the second laser beam outputted from the first light source toward the first mirror, and reflecting the third laser beam outputted from the second light source toward the first mirror;
a polarization stabilizer for transmitting an S-polarized component in the first laser beam and the second laser beam outputted from the first light source at a predetermined ratio relative to the total S-polarized component in the first laser beam and the second laser beam; and
a polarization beam splitter, disposed between the polarization stabilizer and the beam splitter, for transmitting the first laser beam or the second laser beam transmitted through the polarization stabilizer, and reflecting the first laser beam or the second laser beam reflected on the optical recording medium, wherein
the polarization beam splitter transmits a P-polarized component in the first laser beam and the second laser beam, and reflects the S-polarized component in the first laser beam and the second laser beam.

14. The optical pickup device according to claim 3, wherein
the light source includes a first light source for outputting a first laser beam of a first wavelength and a second laser beam of a second wavelength shorter than the first wavelength, and a second light source for outputting a third laser beam of a third wavelength shorter than the second wavelength, and
the optical pickup device further includes:
a beam splitter for transmitting the first laser beam and the second laser beam outputted from the first light source toward the first mirror, and reflecting the third laser beam outputted from the second light source toward the first mirror; and
a polarization beam splitter, disposed between the first light source and the beam splitter, for transmitting the first laser beam or the second laser beam outputted from the first light source, and reflecting the first laser beam or the second laser beam reflected on the optical recording medium, wherein
the polarization beam splitter includes a first optical film for transmitting a P-polarized component in the first laser beam and the second laser beam, and reflecting an S-polarized component in the first laser beam and the second laser beam, and a second optical film for transmitting the P-polarized component in the first laser beam at a predetermined transmittance without transmitting the S-polarized component in the first laser beam, and transmitting the P-polarized component in the second laser beam and reflecting the S-polarized component in the second laser beam.

15. An optical recording medium driving device for recording and/or reproducing information to and/or from an optical recording medium, comprising:
a spindle motor for rotating the optical recording medium; and
the optical pickup device of claim 1 including:
a signal detector for receiving the laser beam reflected on the optical recording medium and converting the received laser beam into an electric signal in accordance with a light intensity of the received laser beam;
an actuator for driving the optical pickup device at least in a radial direction with respect to an information track in the optical recording medium;

a signal processor for generating a tracking error signal based on the electric signal sent from the signal detector of the optical pickup device; and a controller for controlling driving of the spindle motor, and controlling driving of the actuator to perform tracking servo control with respect to the optical recording medium based on the tracking error signal sent from the signal processor.

16. The optical pickup device according to claim 5, wherein the light source includes a first light source for outputting a first laser beam of a first wavelength and a second laser beam of a second wavelength shorter than the first wavelength, and a second light source for outputting a third laser beam of a third wavelength shorter than the second wavelength, and the optical pickup device further includes:

a beam splitter for transmitting the first laser beam and the second laser beam outputted from the first light source toward the first mirror, and reflecting the third laser beam outputted from the second light source toward the first mirror;

a polarization stabilizer for transmitting an S-polarized component in the first laser beam and the second laser beam outputted from the first light source at a predetermined ratio relative to the total S-polarized component in the first laser beam and the second laser beam; and a polarization beam splitter, disposed between the polarization stabilizer and the beam splitter, for transmitting the first laser beam or the second laser beam transmitted through the polarization stabilizer, and reflecting the first laser beam or the second laser beam reflected on the optical recording medium, wherein the polarization beam splitter transmits a P-polarized component in the first laser beam and the second laser beam, and reflects the S-polarized component in the first laser beam and the second laser beam.

17. The optical pickup device according to claim 5, wherein the light source includes a first light source for outputting a first laser beam of a first wavelength and a second laser beam of a second wavelength shorter than the first wavelength, and a second light source for outputting a third- laser beam of a third wavelength shorter than the second wavelength, and the optical pickup device further includes:

a beam splitter for transmitting the first laser beam and the second laser beam outputted from the first light source toward the first mirror, and reflecting the third laser beam outputted from the second light source toward the first mirror; and a polarization beam splitter, disposed between the first light source and the beam splitter, for transmitting the first laser beam or the second laser beam outputted from the first light source, and reflecting the first laser beam or the second laser beam reflected on the optical recording medium, wherein the polarization beam splitter includes a first optical film for transmitting a P-polarized component in the first laser beam and the second laser beam, and reflecting an S-polarized component in the first laser beam and the second laser beam, and a second optical film for transmitting the P-polarized component in the first laser beam at a predetermined transmittance without transmitting the S-polarized component in the first laser beam, and transmitting the P-polarized component in the second laser beam and reflecting the S-polarized component in the second laser beam.

18. An optical recording medium driving device for recording and/or reproducing information to and/or from an optical recording medium, comprising:

a spindle motor for rotating the optical recording medium; and the optical pickup device of claim 2 including:

a signal detector for receiving the laser beam reflected on the optical recording medium and converting the received laser beam into an electric signal in accordance with a light intensity of the received laser beam;

an actuator for driving the optical pickup device at least in a radial direction with respect to an information track in the optical recording medium;

a signal processor for generating a tracking error signal based on the electric signal sent from the signal detector of the optical pickup device; and a controller for controlling driving of the spindle motor, and controlling driving of the actuator to perform tracking servo control with respect to the optical recording medium based on the tracking error signal sent from the signal processor.

* * * * *